(12) United States Patent
Tachikawa et al.

(10) Patent No.: US 11,064,593 B2
(45) Date of Patent: Jul. 13, 2021

(54) CONTROLLER AND ELECTRIC FURNITURE

(71) Applicant: PARAMOUNT BED CO., LTD., Tokyo (JP)

(72) Inventors: Tomokazu Tachikawa, Tokyo (JP); Kazuya Tokugi, Tokyo (JP)

(73) Assignee: PARAMOUNT BED CO., LTD., Tokyo (JP)

(*) Notice: Subject to any disclaimer, the term of this patent is extended or adjusted under 35 U.S.C. 154(b) by 0 days.

(21) Appl. No.: 16/765,621

(22) PCT Filed: Nov. 22, 2018

(86) PCT No.: PCT/JP2018/043163
§ 371 (c)(1),
(2) Date: May 20, 2020

(87) PCT Pub. No.: WO2019/202766
PCT Pub. Date: Oct. 24, 2019

(65) Prior Publication Data
US 2020/0305256 A1    Sep. 24, 2020

(30) Foreign Application Priority Data
Apr. 17, 2018   (JP) .............................. JP2018-079211

(51) Int. Cl.
*H05B 47/105* (2020.01)
*G05B 15/02* (2006.01)
(Continued)

(52) U.S. Cl.
CPC ......... *H05B 47/105* (2020.01); *A47C 31/008* (2013.01); *A61G 5/1056* (2013.01);
(Continued)

(58) Field of Classification Search
CPC .... A47C 31/008; A61G 5/1056; A61G 7/018; A61G 7/057; G05B 15/02
See application file for complete search history.

(56) References Cited

U.S. PATENT DOCUMENTS

2012/0200493 A1* 8/2012 Garfio .................... G06F 3/041
                                                      345/156
2018/0008052 A1* 1/2018 Krickeberg ............ A61G 15/10

FOREIGN PATENT DOCUMENTS

JP         2005136518 A      5/2005
JP         2011112309 A      6/2011
(Continued)

OTHER PUBLICATIONS

International Search Report dated Feb. 12, 2019, mailed in counterpart International Application No. PCT/JP2018/043163, 8 pages.

*Primary Examiner* — Anh Q Tran
(74) *Attorney, Agent, or Firm* — Kim & Stewart LLP

(57) ABSTRACT

According to the embodiments, the controller includes a first receiving unit and a second receiving unit, and is capable of controlling a device to be controlled. The controller is in a first mode when in a first action state prior to the first receiving unit receiving a first operation, and the controller transitions to a second mode when the first receiving unit receives the first operation. The second receiving unit is in the first optical state in the first action state. The second receiving unit is in a second optical state in a second action state prior to the second receiving unit receiving a second operation in the second mode. The second receiving unit is in a third optical state in a third action state in which the second receiving unit has received the second operation in the second mode. The second optical state differs from the second optical state. The third optical state differs from the
(Continued)

first optical state and differs from the third optical state. A controller and an electric furniture that are easier to use can be provided.

20 Claims, 21 Drawing Sheets

(51) Int. Cl.
*A47C 31/00* (2006.01)
*A61G 5/10* (2006.01)
*A61G 7/018* (2006.01)
*A61G 7/057* (2006.01)

(52) U.S. Cl.
CPC .............. *A61G 7/018* (2013.01); *A61G 7/057* (2013.01); *G05B 15/02* (2013.01); *A61G 2203/12* (2013.01)

(56) References Cited

FOREIGN PATENT DOCUMENTS

| | | |
|---|---|---|
| JP | 2012018465 A | 1/2012 |
| WO | 2014045588 A1 | 3/2014 |

\* cited by examiner

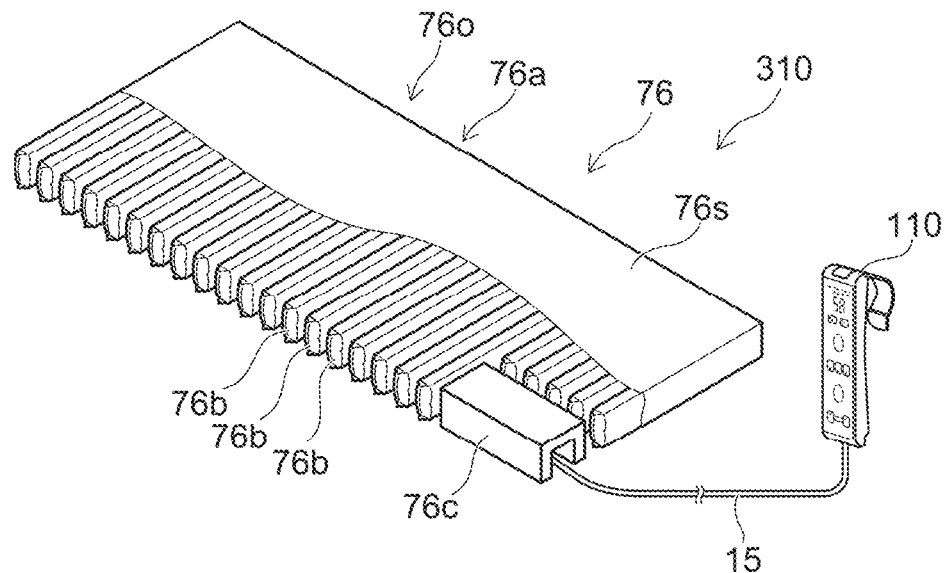
FIG. 1A
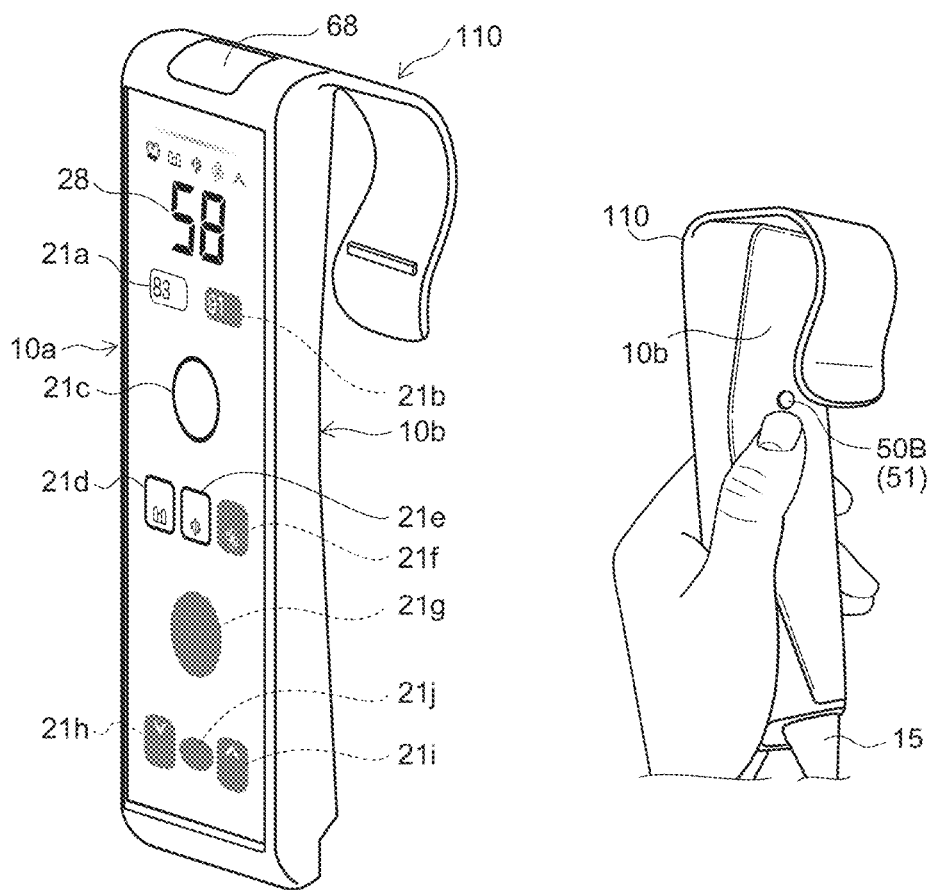
FIG. 1B
FIG. 1C

*FIG. 7*

| 51 | M1 | M2 | | | M1 |
|---|---|---|---|---|---|
| 52 | R1<br>T1<br>(OFF) | R2<br>T2<br>(HON) | R3<br>T3<br>(ON) | | T3<br>(ON) |
| 53 | T4<br>(OFF) | T4<br>(OFF) | R4<br>T5<br>(HON) | R5<br>T6<br>(ON) | T4<br>(OFF) |
| 54 | T7<br>(OFF) | T7<br>(OFF) | R7<br>T9<br>(ON) | R6<br>T8<br>(HON) | T7<br>(OFF) |
| 55 | T10<br>(ON) | T11<br>(OFF) | T11<br>(OFF) | T11<br>(OFF) | T11<br>(OFF) |

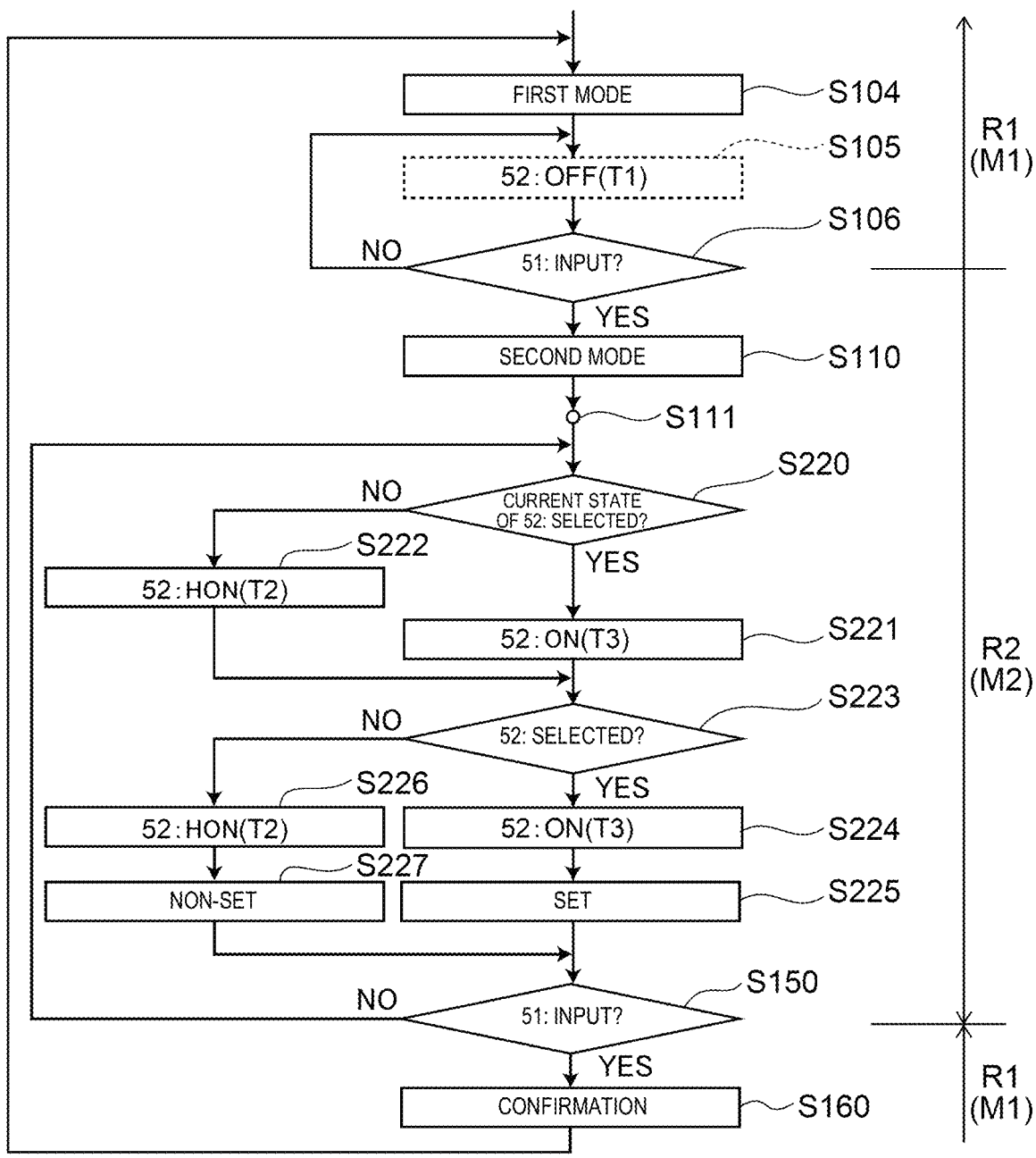

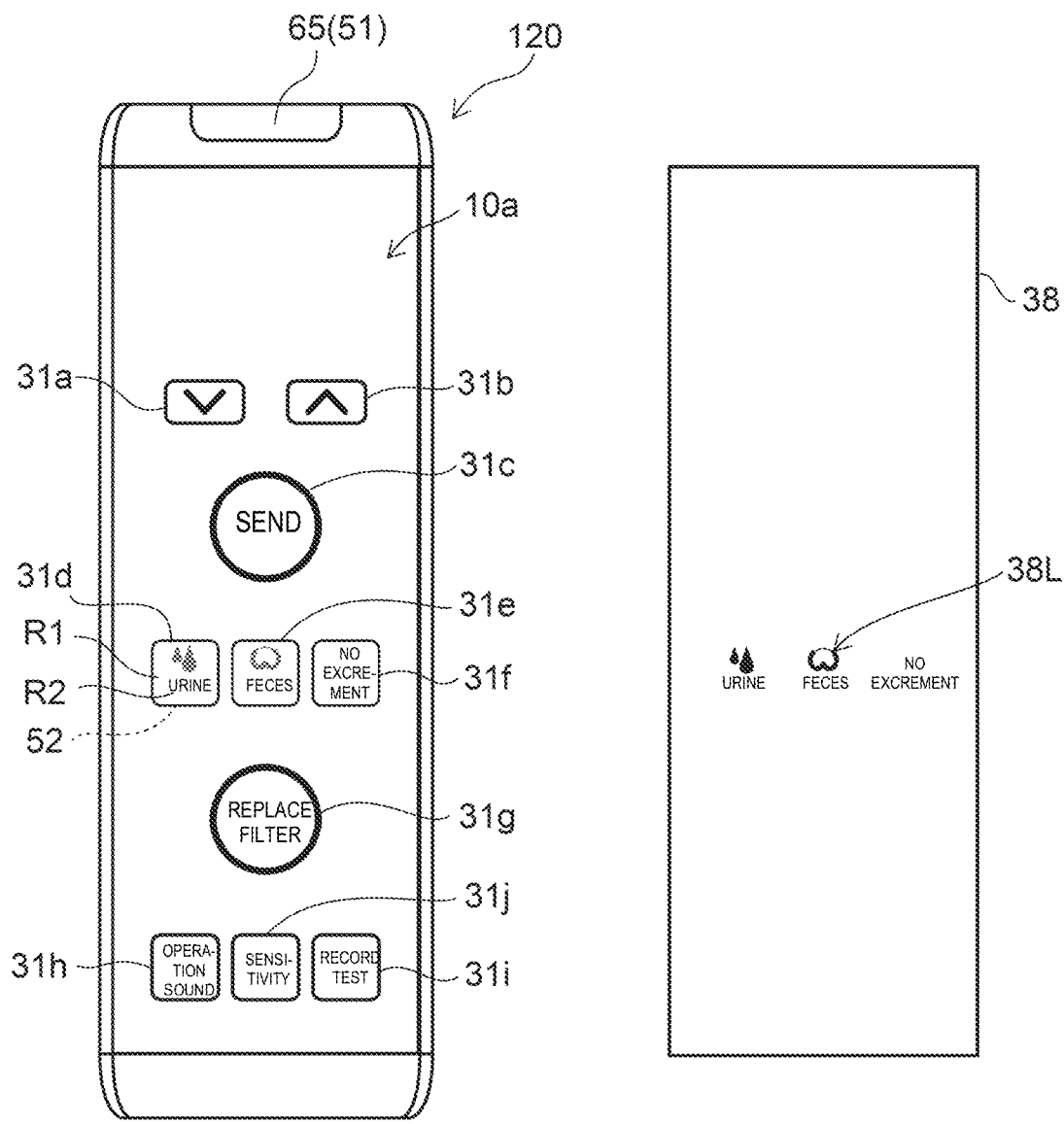
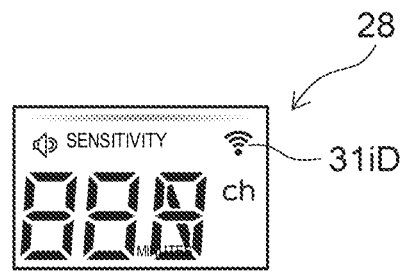

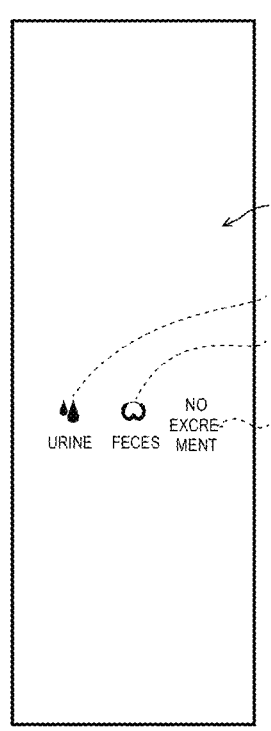 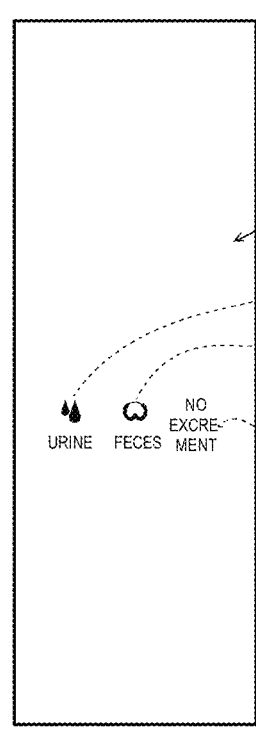 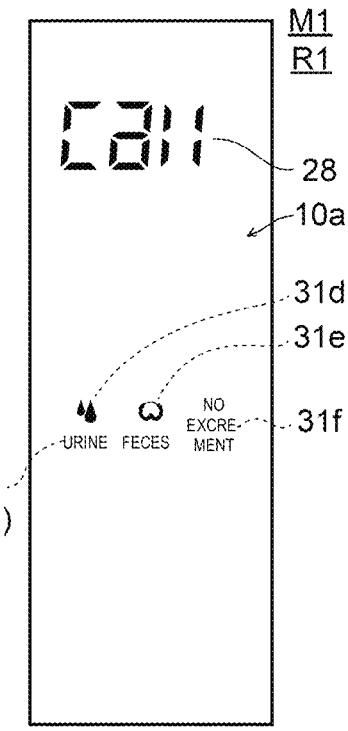
FIG. 19A  FIG. 19B  FIG. 19C
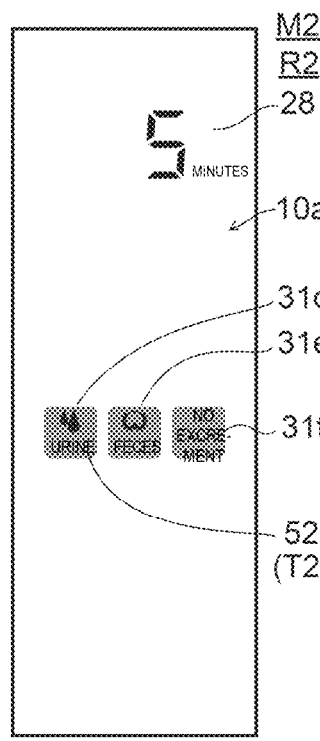 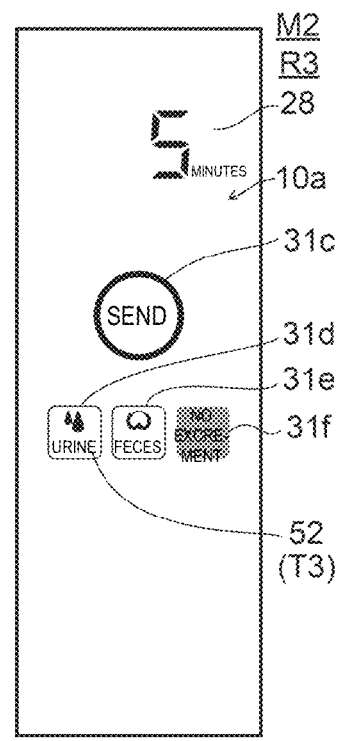
FIG. 19D  FIG. 19E

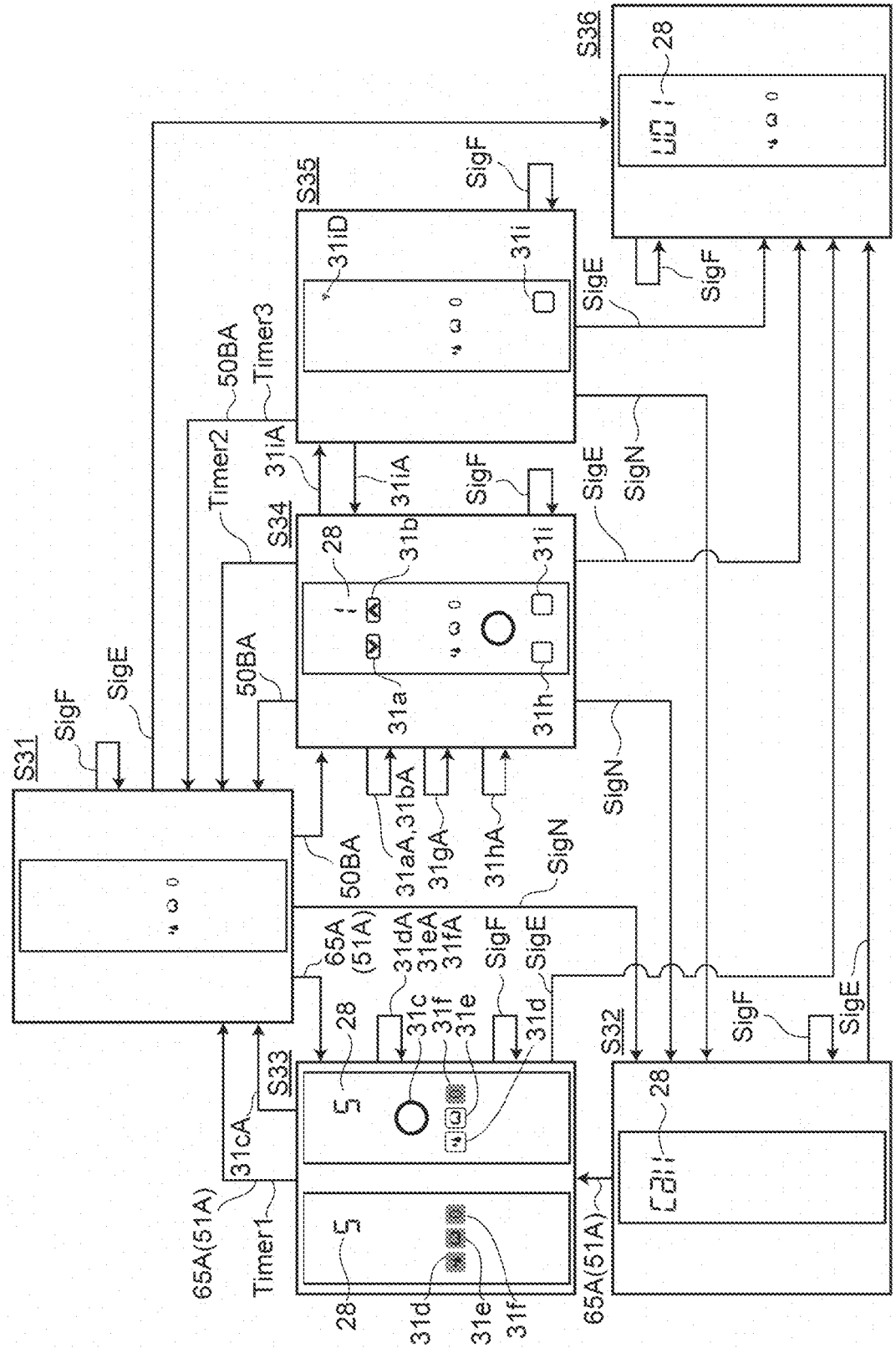

CONTROLLER AND ELECTRIC FURNITURE

TECHNICAL FIELD

The embodiments of the present invention relate to a controller and an electric furniture.

BACKGROUND ART

A variety of devices such as mattresses and sensors are provided on electric articles of furniture (for example, electric beds, electric chairs, and the like). The operations of these devices are controlled by a hand-held switch or similar controller (for example, a remote controller). There is a demand for improved ease of use for such remote controllers.

CITATION LIST

Patent Literature

Patent Document 1: WO/2014/045588

SUMMARY OF INVENTION

Technical Problem

The embodiments of the present invention provide a controller and an electric furniture that are easier to use.

Solutions to Problem

According to the embodiments, the controller includes a first receiving unit and a second receiving unit, and is capable of controlling a device to be controlled. The controller is in a first mode when in a first action state prior to the first receiving unit receiving a first operation, and the controller transitions to a second mode when the first receiving unit receives the first operation. The second receiving unit is in a first optical state in the first action state. The second receiving unit is in a second optical state in a second action state prior to the second receiving unit receiving a second operation in the second mode. The second receiving unit is in a third optical state in a third action state in which the second receiving unit has received the second operation in the second mode. The second optical state includes at least one of a second brightness that is brighter than a first brightness of the first optical state, and a second color that differs from a first color of the first optical state. The third optical state includes at least one of a third brightness that is brighter than the second brightness and a third color that differs from the first color and the second color.

Advantageous Effects of the Invention

The embodiments of the present invention can provide a controller and an electric furniture that are easier to use.

BRIEF DESCRIPTION OF THE DRAWINGS

FIG. 1A to 1C are schematic perspective views illustrating a controller and an electric furniture according to Embodiment 1.

FIG. 7 is a schematic drawing illustrating actions of the controller according to Embodiment 1.

FIG. 9 is a flowchart illustrating actions of the controller according to Embodiment 1.

FIG. 17A to 17C are schematic drawings illustrating the controller and the electric furniture according to Embodiment 2.

FIG. 19A to 19E are schematic drawings illustrating actions of the controller according to Embodiment 2.

FIG. 21 is a schematic drawing illustrating actions of the controller according to Embodiment 2.

DESCRIPTION OF EMBODIMENTS

Figures 2A, 2B:
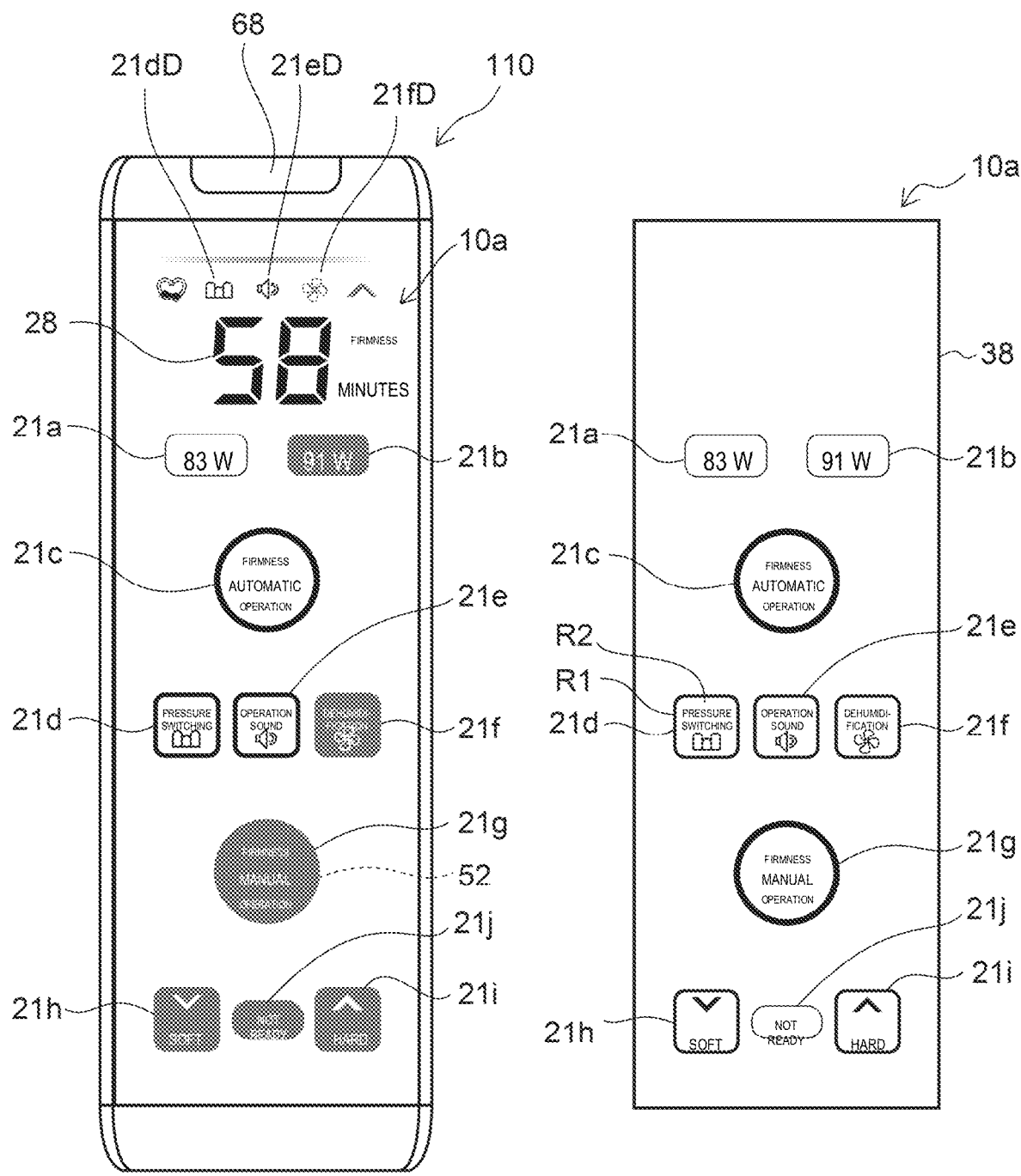
FIGS. 2A and 2B are schematic drawings illustrating the controller according to Embodiment 1.

Hereinafter, embodiments of the present invention are described while referencing the drawings.

The drawings are schematic or conceptual drawings, and the relationships between the thicknesses and the widths of the various components, the size ratios among the components, and the like may differ from the actual components. Even when the same components are illustrated, depending on the drawing, the dimensions and ratios may be illustrated differently.

In the present specification and the various drawings, elements that are identical to those described for a previous drawing are marked with the same reference numerals, and detailed descriptions thereof are appropriately forgone.

Embodiment 1

FIG. 1A to 1C are schematic perspective views illustrating a controller and an electric furniture according to Embodiment 1.

As illustrated in FIG. 1A, a controller 110 according to Embodiment 1 is used together with a mattress 76. In one example, an electric furniture 310 according to the present embodiment includes the controller 110 and the mattress 76.

In one example, the mattress 76 is an electric mattress. In this example, the mattress 76 is an air mattress. The mattress 76 includes an air mattress portion 76*a* and a sheet 76*s* (for example, a mattress cover). The air mattress portion 76*a* is provided inside the sheet 76*s*. The air mattress portion 76*a* includes a plurality of air cells 76*b*. A pump unit 76*c* supplies air to the plurality of air cells 76*b*. The firmness and shape of the air mattress portion 76*a* can be changed depending on the amount of air.

In one example, the controller 110 is connected to the pump unit 76*c*. The connection between the pump unit 76*c* and the controller 110 may be wired or wireless. In this example, the controller 110 is connected to the pump unit 76*c* via a cable 15.

The actions of the pump unit 76*c* and the firmness and shape of the air mattress portion 76*a* can be controlled by operations of the controller 110. In one example, the controller 110 is implemented as a remote controller of the electric furniture 310. Here, the mattress 76 is an example of a device to be controlled 76*o* by the controller 110.

FIGS. 1B and 1C illustrate the controller 110. As illustrated in FIGS. 1B and 1C, the controller 110 includes a first surface 10*a* and a second surface 10*b*. The second surface 10*b* is the surface of the side opposite the first surface 10*a*. The first surface 10*a* is the front surface, for example. The second surface 10*b* is the back surface, for example.

In this example, the controller 110 includes a back side button 50B. The back side button 50B is provided on the second surface 10*b*. The back side button 50B is a condition setting button, for example. In one example, the back side button 50B functions as a first receiving unit 51 (described later). The back side button 50B (for example, the first receiving unit 51) receives operations by a user (including a caregiver) of the electric furniture 310 or the like.

In one example, the controller 110 (and the electric furniture 310) is provided with operating modes and condition setting modes. In the operating modes, the mattress 76 operates. In the condition setting modes, the action conditions of the mattress 76 can be set.

In one example, the back side button 50B is operated when changing the settings of the action conditions. The operation of the back side button 50B (for example, pressing the button) transitions the controller 110 from an operating mode to a condition setting mode. Pressing the back side button 50B again returns the controller 110 to the operating mode from the condition setting mode. The condition setting modes are used less frequently than the operating modes. Accordingly, the frequency of use of the back side button 50B is low. In one example, the back side button 50B is provided on the back surface (the second surface 10*b*). It is preferable that the operation of the back side button 50B include a mechanical action such as "button pressing" or the like. Due to this configuration, mis-operations of the back side button 50B are suppressed.

In this example, a specific action button 68 is provided on a side portion (top portion) of the controller 110. A specific action is performed for a predetermined amount of time when the specific action button 68 is operated. Examples of the specific action are given later. For example, in the operating modes, bedsores and the like can be prevented by changing the firmness (height), or the like, of the plurality of air cells 76*b*. It is also possible to realize massage effects, for example.

Hereinafter, an example of the operating modes is described. In this example, the operating modes include "automatic firmness operation" and "manual firmness operation." In the "automatic firmness operation", the firmness of the mattress 76 is automatically set depending on the load applied when the user lays down on the mattress 76. In the "manual firmness operation", the firmness of the mattress 76 is set by an operation by an operator.

In one example, the "pressure" of the mattress 76 may be switchable. In another example, the condition of the operation sounds may be changeable. In another example, whether to perform dehumidification may be switchable. The settings of these conditions can be changed in the condition setting modes. The controller 110 may be used in combination with one of a plurality of types of mattresses 76 that have different widths (lengths in the left-right direction). As such, the action conditions of the device to be controlled 76*o* (or the action conditions of the controller 110) may be changed so as to be compatible with this plurality of types of mattresses 76.

In the embodiments, the displaying and operations on the first surface 10*a* in the operating modes is simplified. Meanwhile, on the first surface 10*a* in the condition setting modes, the necessary displaying and the portions corresponding to the necessary operations are displayed in an easy-to-understand manner.

Next, an example is described of a button (operation receiving unit) that can be used in the condition setting modes. In one example, a touch-type "button" is provided on the first surface 10*a*. The "button" provided on the first surface 10*a* may be capable of receiving non-contact operations. For example, the "button" provided on the first surface 10*a* may be a capacitance-type "button." The "button" may be a pressure-sensitive-type "button." The "button" may be an optical-type "button." The "button" may be a sonic-type (including ultrasonic waves, for example) "button."

A configuration is possible in which the "button" can receive operations and, also, at least one of the brightness and the color of the "button" can be changed. In one example, the "button" functions as a "user interface display unit."

In the example illustrated in FIG. 1B, first to tenth user interface display units 21*a* to 21*j* are provided on the first surface 10*a*. Hereinafter, some examples of the user interface display units 21*a* to 21*j* are described.

FIGS. 2A and 2B are schematic drawings illustrating the controller 110 according to Embodiment 1. At least one of the first to tenth user interface display units 21*a* to 21*j* is capable of receiving an operation (for example, an operation by a user or the like), and can be displayed. As described later, the displaying includes an ON state, an OFF state, and a half-ON state. In FIG. 2A, the plurality of states of the displaying are indicated by the states of the images.

FIG. 2B illustrates an example of a pattern of the user interface display units. FIG. 2B corresponds to a situation in which all of the user interface display units are in the ON state. As illustrated in FIG. 2B, the controller 110 includes a plate member 38. In one example, the plate member 38 is a nameplate. In one example, a display pattern is formed by light transmittance differences of the plate member 38. The light transmittance differences can be controlled by a light absorption layer (light attenuation layer) provided on the plate member 38.

In a case in which the first to tenth user interface display units 21*a* to 21*j* are light-emitting units, the first to tenth user interface display units 21*a* to 21*j* emit light when in the ON state and the half-ON state. The brightness in the ON state is higher than the brightness in the half-ON state. The first to tenth user interface display units 21*a* to 21*j* do not emit light when in the OFF state. The brightness in the OFF state is lower than the brightness in the half-ON state.

The first user interface display unit 21a is, for example, capable of displaying that the width (one of the action conditions) of the mattress 76 is set to "83 W." The first user interface display unit 21a is, for example, capable of receiving an operation for setting the width of the mattress 76 to "83 W." In the example of FIG. 2A, the first user interface display unit 21a is in the ON state.

The second user interface display unit 21b is, for example, capable of displaying that the width (one of the action conditions) of the mattress 76 is set to "91 W." The second user interface display unit 21b is, for example, capable of receiving an operation for setting the width of the mattress 76 to "91 W." In the example of FIG. 2A, the second user interface display unit 21b is in the half-ON state. In this example, when "83 W" is selected, "91 W" is un-selected. When "91 W" is selected, "83 W" is un-selected. When "83 W" is selected, "91 W" is un-selected.

The third user interface display unit 21c is, for example, capable of displaying that "automatic firmness operation" (one of the action conditions) is set. The third user interface display unit 21c is, for example, capable of receiving an operation for setting one of the action conditions to "automatic firmness operation." In the example of FIG. 2A, the third user interface display unit 21c is in the ON state.

The fourth user interface display unit 21d is, for example, capable of displaying that "pressure switching" (one of the action conditions) is set to the ON state. The fourth user interface display unit 21d is, for example, capable of receiving an operation for setting "pressure switching" to the ON state. The setting of the "pressure switching" is switched from the ON state to the OFF state or from the OFF state to the ON state as a result of the fourth user interface display unit 21d receiving an operation. In the example of FIG. 2A, the fourth user interface display unit 21d is in the ON state.

The fifth user interface display unit 21e is, for example, capable of displaying that "operation sounds" (one of the action conditions) is set to the ON state. The fifth user interface display unit 21e is, for example, capable of receiving an operation for setting "operations sounds" to the ON state. The setting of the "operation sounds" is switched from the ON state to the OFF state or from the OFF state to the ON state as a result of the fifth user interface display unit 21e receiving an operation. In the example of FIG. 2A, the fifth user interface display unit 21e is in the ON state.

The sixth user interface display unit 21f is, for example, capable of displaying that "dehumidification" (one of the action conditions) is set to the ON state. The sixth user interface display unit 21f is, for example, capable of receiving an operation for setting "dehumidification" to the ON state. The setting of "dehumidification" is switched from the ON state to the OFF state or from the OFF state to the ON state as a result of the sixth user interface display unit 21f receiving an operation. In the example of FIG. 2A, the sixth user interface display unit 21f is in the half-ON state.

The seventh user interface display unit 21g is, for example, capable of displaying that "manual firmness operation" (one of the action conditions) is set. The seventh user interface display unit 21g is, for example, capable of receiving an operation for setting one of the action conditions to "manual firmness operation." In the example of FIG. 2A, the seventh user interface display unit 21g is in the half-ON state. In this example, when "manual firmness operation" is selected, "automatic firmness operation" is un-selected. When "automatic firmness operation" is selected, "manual firmness operation" is un-selected.

The eighth user interface display unit 21h is, for example, capable of displaying that "soft" (one of the action conditions) can be set. The eighth user interface display unit 21h is, for example, capable of receiving an operation for setting one of the action conditions to "soft." In the example of FIG. 2A, the eighth user interface display unit 21h is in the half-ON state.

The ninth user interface display unit 21i is, for example, capable of displaying that "hard" (one of the action conditions) can be set. The ninth user interface display unit 21i is, for example, capable of receiving an operation for setting one of the action conditions to "hard." In the example of FIG. 2A, the ninth user interface display unit 21i is in the half-ON state.

The tenth user interface display unit 21j is, for example, capable of displaying that the device is "not ready" (one of the action conditions). For example, the displaying of "not ready", which indicates that the mattress 76 is currently being inflated to an initial state, is illuminated in the tenth user interface display unit 21j. In the example of FIG. 2A, the tenth user interface display unit 21j is in the half-ON state. In one example, the tenth user interface display unit 21j may be capable of not only displaying, but also of receiving operations.

In this example, a display 28 is provided on the first surface 10a. The display 28 is capable of displaying various types of information. In the example of FIG. 2A, the display 28 displays the remaining time of the performance of the specific action from when the specific action button 68 was operated.

In this example, the first surface 10a includes display sections 21dD, 21eD, and 21fD. The display section 21dD displays the setting state set by the fourth user interface display unit 21d. For example, when the "pressure switching" is set to the ON state, the display section 21dD assumes the ON state. The display section 21eD displays the setting state set by the fifth user interface display unit 21e. For example, when the "operation sounds" is set to the ON state, the display section 21eD assumes the ON state. The display section 21fD displays the setting state set by the sixth user interface display unit 21f. For example, when the "dehumidification" is set to the ON state, the display section 21fD assumes the ON state. The display sections 21dD, 21eD, and 21fD can, for example, be displayed when a corresponding action is set and in the operating modes.

When in the operating modes, at least a portion of the first to tenth user interface display units 21a to 21j are in the OFF state and the displays thereof are substantially invisible. At least a portion of the first to tenth user interface display units 21a to 21j are capable of displaying (ON state or half-ON state) depending on the states in the condition setting modes.

In the example of FIG. 2B, the user interface display units and the display sections that are not typically simultaneously displayed (illuminated), are illustrated as being displayed. This is to facilitate description of the user interface display units, the display sections, and the like.

In the following description, an example is given in which the seventh user interface display unit 21g ("manual firmness operation") is defined as a second receiving unit 52. Moreover, the back side button 50B (see (b) of FIG. 1) is defined as the first receiving unit 51. The first receiving unit 51 receives a first operation (in this example, an action of pressing the back side button 50B).

The second receiving unit 52 is capable of receiving a second operation. The second operation is, for example, an operation by an operator of the controller 110. The brightness of the second receiving unit 52 is changeable. In one example, the second receiving unit 52 includes an ON state, an OFF state, and a half-ON state.

Figure 3A:
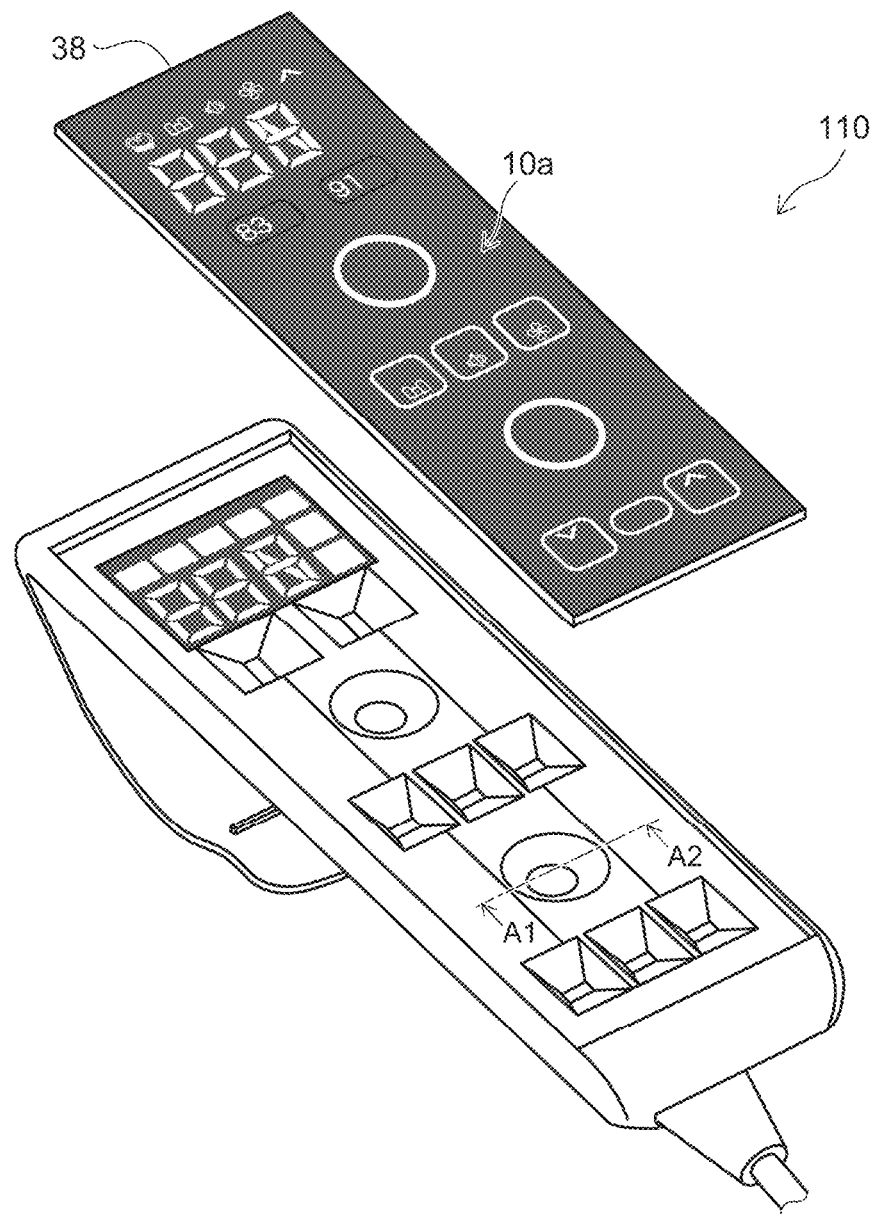
FIGS. 3A and 3B are schematic drawings illustrating the controller according to Embodiment 1.
Figure 3B:
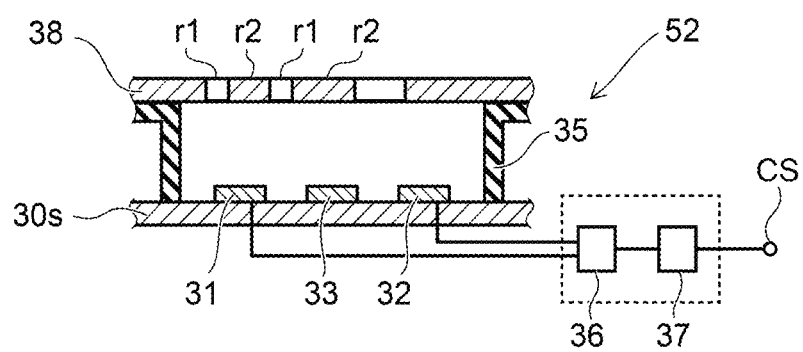

FIGS. 3A and 3B are schematic drawings illustrating the controller 110 according to Embodiment 1. In order to make FIG. 3A easier to view, the plate member 38 is drawn separated from the controller 110. FIG. 3B is a cross-sectional view taken along line A1-A2 of FIG. 3A. In this example, a cross-section of the seventh user interface display unit 21g is illustrated. The other user interface display units may be provided with a structure similar to that of the seventh user interface display unit 21g.

As illustrated in FIG. 3B, the second receiving unit 52 includes a first electrode 31, a second electrode 32, and a light emitting element 33. In one example, the first electrode 31, the second electrode 32, and the light emitting element 33 are provided on a substrate 30s (for example, a printed circuit board). The plate member 38 is provided above the first electrode 31, the second electrode 32, and the light emitting element 33. A spacer 35 is provided between the substrate 30s and the plate member 38. The plate member 38 is separated from the first electrode 31, the second electrode 32, and the light emitting element 33.

The second operation of the second receiving unit 52 is received by the first electrode 31 and the second electrode 32. The second operation of the second receiving unit 52 is, for example, based on a change in the capacitances of the first electrode 31 and the second electrode 32.

In one example, the first electrode 31 and the second electrode 32 are electrically connected to a detection circuit 36. The detection circuit 36 detects, for example, changes in the capacitances of the first electrode 31 and the second electrode 32. The detection results are supplied to a control circuit 37. The control circuit 37 outputs a control signal CS. The settings of the various action conditions of the controller 110 are performed on the basis of the control signal CS.

For example, the capacitances of the first electrode 31 and the second electrode 32 change when a finger of the operator approaches the first electrode 31 and the second electrode 32. An operation (the second operation) is detected due to the changes in capacitances. The second receiving unit 52 is, for example, a touch-type user interface device. The second receiving unit 52 may, for example, be a non-contact-type user interface device.

The brightness (for example, ON state, OFF state, and half-ON state) of the second receiving unit 52 can change in accordance with the amount of light (for example, the brightness) emitted from the light emitting element 33.

The light emitted from the light emitting element 33 passes through the plate member 38 and, as a result, is recognized as a display pattern. The plate member 38 includes an "overlapping portion" that overlaps with the second receiving unit 52 (see FIG. 3B). As illustrated in FIG. 3B, the "overlapping portion" includes first regions r1 and second regions r2. The light transmittance of the first regions r1 is different than the light transmittance of the second regions r2. The light transmittance of the first regions r1 is higher than the light transmittance of the second regions r2. Display patterns (characters, shapes, pictograms, and the like) can be formed using these regions. The first regions r1 and/or the second regions r2 includes information about the action conditions of the controller 110 (or about the mattress 76, which is a device to be controlled 76o).

As described above, it is preferable that the operation of the first receiving unit 51 (the back side button 50B; see FIG. 1B) involves a mechanical operation (strong force). Meanwhile, it is preferable that the second receiving unit 52 can be operated with weak force. The first receiving unit 51 receives an operation by an action of "button pressing." At this time, the first receiving unit 51 deforms along with the operation. In contrast, the second receiving unit 52 receives an operation due to being lightly touched by a finger. At this time, the second receiving unit 52 substantially does not deform.

Thus, the first receiving unit 51 deforms when the first operation is received. Meanwhile, the second receiving unit 52 substantially does not deform when the second operation is received. The deformation (amount of deformation) of the second receiving unit 52 from when the second operation is received is smaller than the deformation (amount of deformation) of the first receiving unit 51 from when the first operation is received.

A configuration is possible in which the plate member 38 substantially does not deform when the second receiving unit 52 receives the second operation.

Next, an example of actions of the various receiving units (user interface devices) of the controller 110 will be described.

Figure 4:
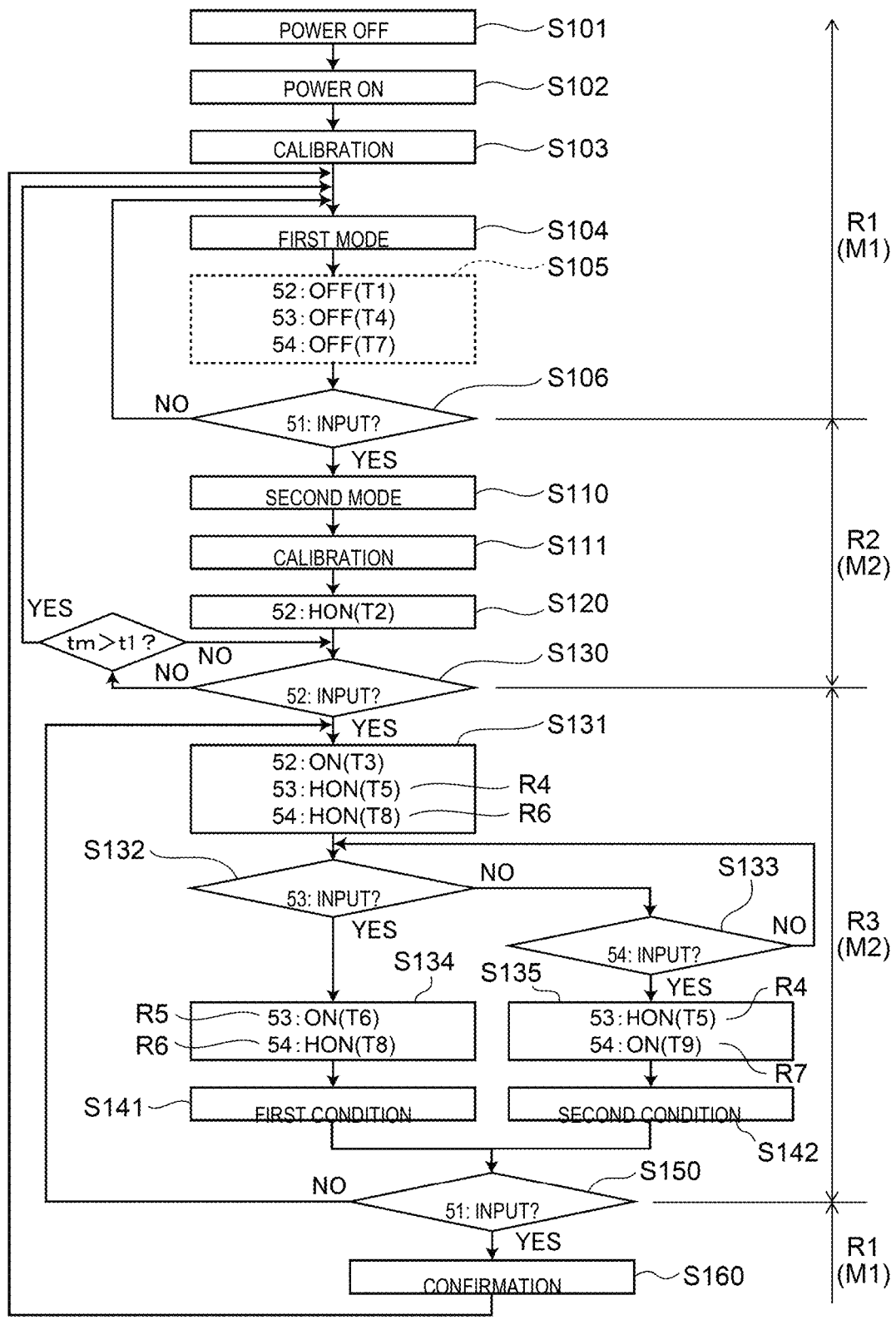
FIG. 4 is a flowchart illustrating actions of the controller according to Embodiment 1.

FIG. 4 is a flowchart illustrating actions of the controller 110 according to Embodiment 1.

Figure 5A:
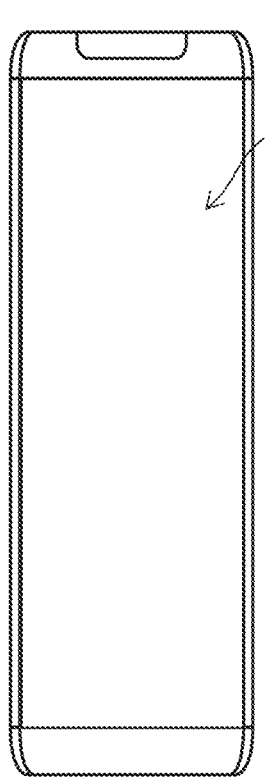
FIG. 5A to 5C are schematic drawings illustrating actions of the controller according to Embodiment 1.
Figure 5B:
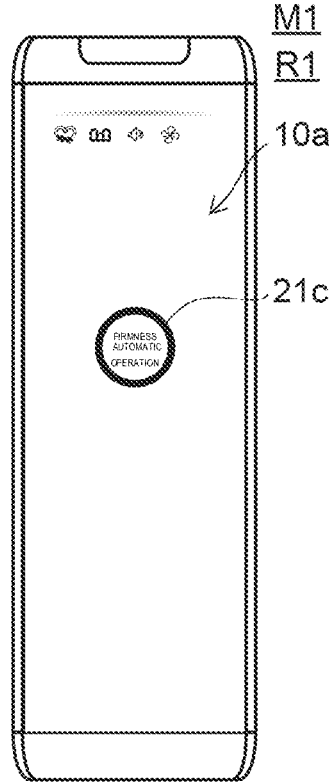
Figure 5C:
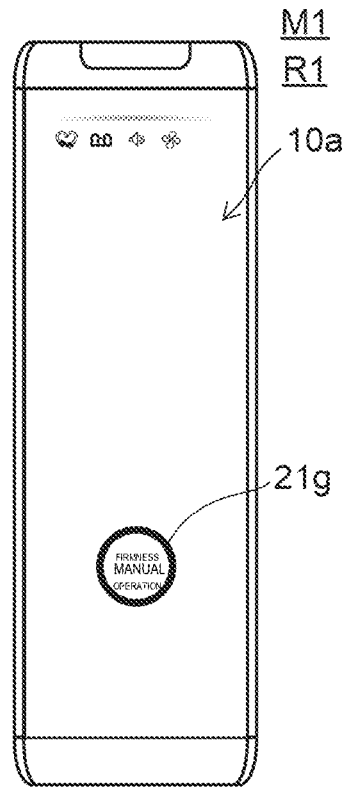

FIG. 5A to 5C are schematic drawings illustrating actions of the controller 110 according to Embodiment 1.

FIG. 6A to 6F are schematic drawings illustrating actions of the controller 110 according to Embodiment 1.

FIG. 5A to 5C and FIG. 6A to 6F illustrate examples of displays on the controller 110 (for example, the states of the first to tenth user interface display units 21a to 21j and the display 28).

As described above, the controller 110 includes the first receiving unit 51 and the second receiving unit 52. The controller 110 is capable of controlling the device to be controlled 76o (in this example, the mattress 76). In this example, the controller 110 further includes a third receiving unit 53 and a fourth receiving unit 54 (see FIG. 6B or the like). In this example, the first receiving unit 51 is implemented as the back side button 50B. The second receiving unit 52 is implemented as the seventh user interface display unit 21g. The third receiving unit 53 is implemented as the eighth user interface display unit 21h. The fourth receiving unit 54 is implemented as the ninth user interface display unit 21l this example, the "firmness" of the mattress 76 can be manually changed by the second operation being received by the second receiving unit 52. The third receiving unit 53 and the fourth receiving unit 54 are used to change the firmness.

The controller 110 includes a first mode M1 and a second mode M2 (see FIG. 4). As illustrated in FIG. 4, the controller 110 is in the first mode M1 when in a first action state R1. The first action state R1 is prior to the first receiving unit receiving a first operation. The controller 110 transitions to the second mode M2 when the first receiving unit 51 receives a first operation.

For example, in the first mode M1 the controller 110 is in an operating mode. In the second mode M2, the controller 110 is in a condition setting mode related to the action of the device to be controlled 76o (in this example, the mattress 76).

As illustrated in FIG. 5A, no displays are provided on the first surface 10a in the power OFF state.

As illustrated in FIG. 4, from the power OFF state (step S101), the power is changed to the ON state (step S102). As illustrated in FIG. 4, calibration may be carried out (step S103). Performing the calibration makes it possible to detect the operations more accurately. The plate member 38 may, for example, deform due to the operation of the second receiving unit 52. For example, the calibration corrects the features that are shifted by the deformation. As a result, the operations are accurately detected. The calibration may be performed as necessary and may be omitted.

In one example, the controller 110 assumes the first mode M1 when the calibration is completed (or when time has elapsed) (step S104). At this time, the first surface 10a is in the state illustrated in FIG. 5A or 5B. FIG. 5B illustrates a display state for when "automatic firmness operation" is set. FIG. 5C illustrates a display state for when "manual firmness operation" is set.

The states illustrated in FIGS. 5B and 5C correspond to the first mode M1 (for example, an operating mode). In the first mode M1 the controller 110 is in a first action state R1. The first action state R1 is a state prior to the first receiving unit 51 receiving the first operation.

In the following, an example of action is described for a case in which the current operating mode is set to "automatic firmness operation", and the operating mode is switched to "manual firmness operation."

The second receiving unit 52 (the seventh user interface display unit 21g) is in a first optical state T1 in the first action state R1 (step S105). The first optical state T1 is the OFF state, for example. The third receiving unit 53 (the eighth user interface display unit 21h) is in a fourth optical state T4 in the first action state R1. The fourth optical state T4 is the OFF state, for example. The fourth receiving unit 54 (the ninth user interface display unit 21i) is in a seventh optical state T7 in the first action state R1. The seventh optical state T7 is the OFF state, for example.

Figures 6A, 6B, 6C:
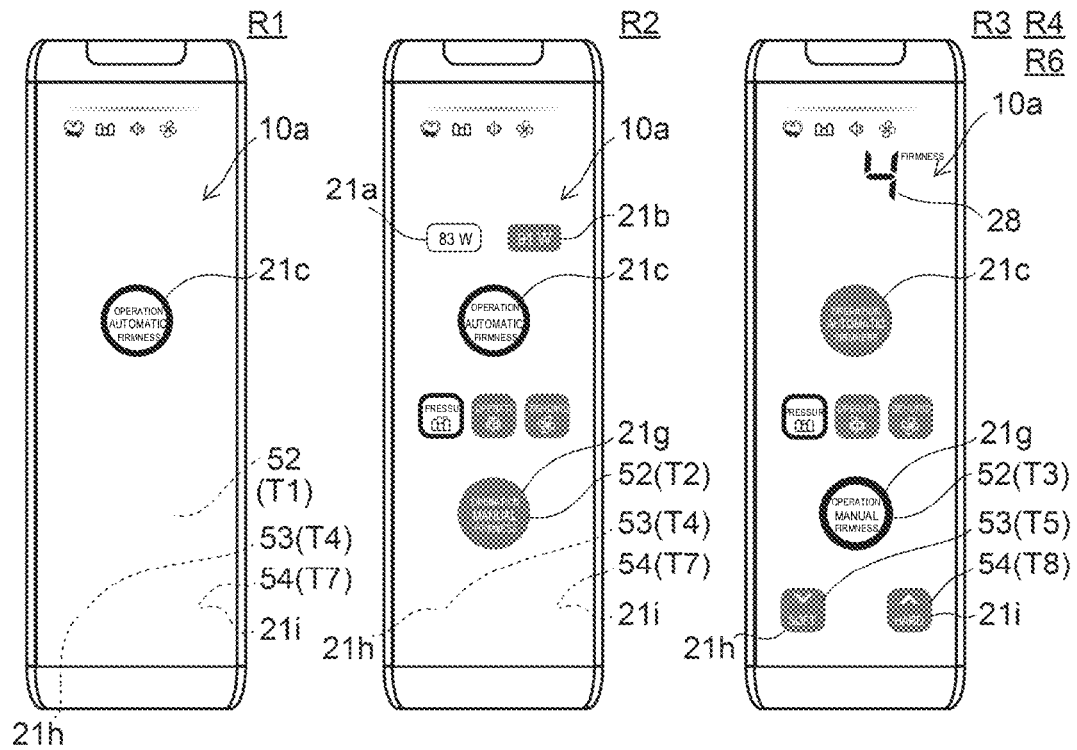
FIG. 6A to 6F are schematic drawings illustrating actions of the controller according to Embodiment 1.

FIG. 6A illustrates the first surface 10a in the first action state R1. The third user interface display unit 21c ("automatic firmness operation") is in the ON state and the other user interface display units are in the OFF state. The second receiving unit 52, the third receiving unit 53, and the fourth receiving unit 54 are substantially invisible.

In this state, it is determined whether the first receiving unit 51 has received the first operation (step S106). When the first receiving unit 51 has not received the first operation, step S104, step S105, or step S106 is executed, for example. When the first receiving unit 51 has received the first operation, the controller 110 transitions to the second mode M2 (step S110). As described above, the second mode M2 is a condition setting mode.

As necessary, the calibration may be carried out (step S111). Configurations are possible in which either step S111 or step S103 is carried out.

Then, the second receiving unit 52 assumes a second optical state T2. The second optical state T2 is a half-ON state HON, for example. For example, the state in the second mode M2 prior to the second receiving unit 52 receiving the second operation is defined as the second action state R2. In the second action state R2, the second receiving unit 52 is in the second optical state T2. When the second receiving unit 52 has received the second operation in the second mode M2, the controller 110 transitions to a third action state R3. The controller 110 is capable of receiving action conditions (or changes to the action conditions) in the third action state R3.

It is determined, for example, whether the second receiving unit 52 has received the second operation (step S130). When the second receiving unit 52 has not received the second operation, step S130 (the second action state R2) is executed, for example. When, for example, there is no receipt of the second operation on the second receiving unit 52, and a time tm is shorter than a first time t1 (predetermined time), step S130 is executed. When, for example, the time tm, of the state in which there is no receipt of the second operation on the second receiving unit 52, exceeds the first time t1, step S104 (the first mode M1) is executed.

Meanwhile, when the second receiving unit 52 has received the second operation, the controller 110 transitions to the third action state R3. Calibration may be carried out at the time of transition from the second action state R2 to the third action state R3.

In the third action state R3, the second receiving unit 52 (the seventh user interface display unit 21g) is in a third optical state T3 (step S131). The third optical state T3 is the ON state, for example.

Thus, the second receiving unit 52 has the first optical state T1 for the first action state R1, the second optical state T2 for the second action state R2, and the third optical state T3 for the third action state R3.

The second optical state T2 differs from the first optical state T1, for example. The third optical state T3 differs from both the first optical state T1 and the second optical state T2. In one example, the second optical state T2 includes at least one of a second brightness that is brighter than a first brightness of the first optical state T1, and a second color that differs from a first color of the first optical state T1. Here, the third optical state T3 includes, for example, at least one of a third brightness that is brighter than the second brightness, and a third color that differs from the first color and the second color.

In another example, flashing is possible. For example, one of the second optical state T2 and the third optical state T3 may be flashing. The other of the second optical state T2 and the third optical state T3 includes at least one of the second brightness that is brighter than the first brightness of the first optical state T1, and the second color that differs from the first color of the first optical state T1.

In another example, the second optical state T2 and the third optical state T2 may be flashing. The flashing state of the second optical state T2 differs from the flashing state of the third optical state T3.

In the following description, the second optical state T2 is defined as being brighter than the first optical state T1, and the third optical state T3 is defined as being brighter than the second brightness.

In the state prior to the second receiving unit 52 becoming capable of receiving operations (the first action state R1), the second receiving unit 52 is in the first optical state T1. In the state in which the second receiving unit 52 is capable of receiving operations (the second action state T2), the second receiving unit 52 is in the second optical state T2. When the second receiving unit 52 has received an operation (the third action state T3), the second receiving unit 52 assumes the third optical state T3.

For example, as illustrated in FIG. 6B, in the second action state R2, the second receiving unit 52 is in the second optical state T2 (the half-ON state HON, for example). In this example, the "current state" of the operating mode is "automatic firmness operation" and, as such, the third user interface display unit 21c is in the ON state.

As illustrated in FIG. 6C, when the second receiving unit 52 has received the second operation (step S131), the second receiving unit 52 transitions to the third optical state T3 (the ON state, for example).

Thus, it is possible to recognize the second receiving unit 52 when necessary, for example. When not necessary, the second receiving unit 52 substantially is not recognized. Moreover, the second optical state T2 displays, in a manner that is easy to understand, that the second receiving unit 52 can receive operations. Furthermore, the third optical state T3 displays, in a manner that is easy to understand, that the second receiving unit 52 has been operated.

The second optical state T2 includes at least one of the second brightness that is brighter than the first brightness of the first optical state T1, and the second color that differs from the first color of the first optical state T1. The third optical state T3 includes at least one of the third brightness that is brighter than the second brightness, and the third color that differs from the first color and the second color. Accordingly, the differences between the first to third optical states may be based on brightness or color.

Thus, in the present embodiment, a controller and an electric furniture that are easier to use can be provided.

In this example, the functions of the third receiving unit 53 and the fourth receiving unit 54 start in accordance with the receipt of the second operation by the second receiving unit 52. As illustrated in step S131, in one example, the firmness of the mattress 76 can be manually changed by operations of the third receiving unit 53 and the fourth receiving unit 54. For example, when the second receiving unit 52 has received the second operation, the third receiving unit 53 (the eighth user interface display unit 21h) assumes a fifth optical state T5, for example. The fifth optical state T5 is the half-ON state HON, for example. At this time, the fourth receiving unit 54 (the ninth user interface display unit 21i) assumes an eighth optical state T8. The eighth optical state T8 is the half-ON state HON (see FIG. 6C), for example.

After step S131, it is determined whether the third receiving unit 53 has received a third operation (step S132). When the third receiving unit 53 has received the third operation, the third receiving unit 53 assumes a sixth optical state T6 (the ON state, for example), and the fourth receiving unit 54 assumes the eighth optical state T8 (the half-ON state HON) (step S134).

When, in step S132, it is determined that the third receiving unit 53 has not received the third operation, it is determined whether the fourth receiving unit 54 received a fourth operation (step S133). When the fourth receiving unit 54 has not received the fourth operation, step S132 is executed. When the fourth receiving unit 54 has received the fourth operation, the fourth receiving unit 54 assumes a ninth optical state T9 (for example, the ON state), and the third receiving unit 53 assumes the fifth optical state T5 (the half-ON state HON) (step S135).

Figures 6D, 6E, 6F:
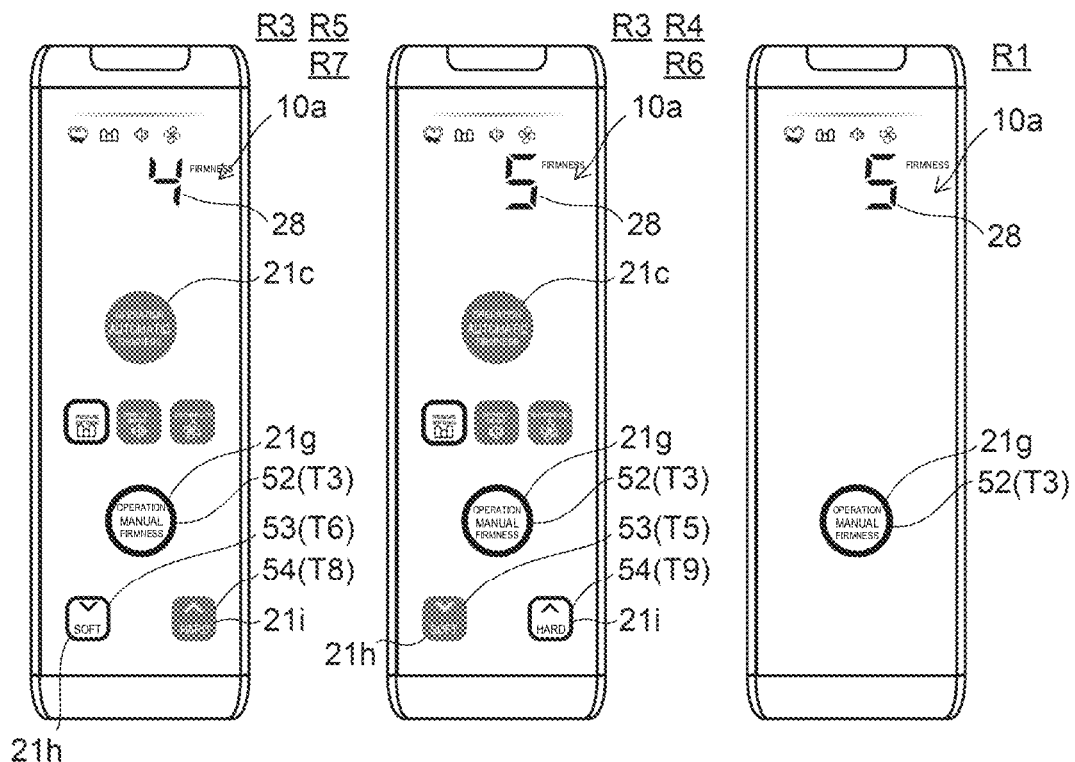

FIG. 6D illustrates a state in which the third receiving unit 53 is selected. FIG. 6E illustrates a state in which the fourth receiving unit 54 is selected.

Thus, one of the third receiving unit 53 and the fourth receiving unit 54 is selected. The selected receiving unit assumes the ON state, for example. The receiving unit that is not selected assumes the half-ON state, for example.

In the present embodiment, the action states of the third receiving unit 53 and the fourth receiving unit 54 are presented in an easy-to-understand manner. Thus, a controller and an electric furniture that are easier to use can be provided.

After step S134, a first condition (in this example, "soft") corresponding to the third receiving unit 53 is set (step S141). In step S135, a second condition (in this example, "hard") corresponding to the fourth receiving unit 54 is set (step S142).

Then, it is determined again whether the first receiving unit 51 has received the first operation (step S150). When the first receiving unit 51 has received the first operation again, for example, the setting described above is "confirmed", and applied to the action (step S160). Configurations are possible in which the "confirmation" is carried out in step S141 or step S142 described above. Then, step S104 (the first mode M1) is executed, for example. The controller 110 returns to an action mode from the condition setting mode, for example.

In step S150, when the first receiving unit 51 has not received the first operation, step S131 (setting changeable state) is executed, for example. Alternatively, a configuration is possible in which, when the elapsed time exceeds a threshold time, step S104 is executed, for example. In this case, the setting change operations may be disabled and the original state may be restored.

As described above, in the first action state R1 and the second action state R2, the third receiving unit 53 is in the fourth optical state T4 (see FIG. 4, FIGS. 6A, and 6B). In the fourth action state R4, which is prior to the third receiving unit 53 receiving the third operation in the third action state R3, the third receiving unit 53 is in the fifth optical state T5 (see FIG. 4, FIGS. 6C, and 6E). In the fifth action state R5 in which the third receiving unit 53 has received the third operation in the third action state R3, the third receiving unit 53 is in the sixth optical state T6 (see FIG. 4 and FIG. 6D).

The fifth optical state T5 includes at least one of a fifth brightness that is brighter than a fourth brightness of the fourth optical state T4, and a fifth color that differs from a fourth color of the fourth optical state T4. The sixth optical state T6 includes at least one of a sixth brightness that is brighter than the fifth brightness and a sixth color that differs from the fourth color and the fifth color.

The fourth optical state T4 is the OFF state, for example. The fifth optical state T5 is the half-ON state HON, for example. The sixth optical state T6 is the ON state, for example.

In the first action state R1 and the second action state R2, the fourth receiving unit 54 is in the seventh optical state T7 (see FIG. 4, FIG. 6A, 6B). In the sixth action state R6 prior to the fourth receiving unit 54 receiving the fourth operation in the third action state R3, the fourth receiving unit 54 is in the eighth optical state T8 (see FIG. 4, FIG. 6C, and FIG. 6D). In the seventh action state R7 in which the fourth receiving unit 54 has received the fourth operation in the third action state R3, the fourth receiving unit 54 is in the ninth optical state T9 (see FIG. 4 and FIG. 6E).

The eighth optical state T8 includes at least one of an eighth brightness that is brighter than a seventh brightness of the seventh optical state T7, and an eighth color that differs from a seventh color of the seventh optical state T7. The ninth optical state T9 includes at least one of a ninth brightness that is brighter than the eighth brightness, and a ninth color that differs from the seventh color and the eighth color.

The seventh optical state T7 is the OFF state, for example. The eighth optical state T8 is the half-ON state HON, for example. The ninth optical state T9 is the ON state, for example.

As previously described, in the example described above, the third receiving unit 53 and the fourth receiving unit 54 have a complementary relationship. For example, when the third receiving unit 53 is in the fifth optical state T5, the fourth receiving unit 54 is in the ninth optical state T9. When the third receiving unit 53 is in the sixth optical state T6, the fourth receiving unit 54 is in the eighth optical state T8.

In one example, in the fifth action state R5, the action condition is set to the first condition (step S141). In the seventh action state R7, the action condition is set to the second condition (step S142). The second condition ("hard", for example) is, for example, the opposite of the first condition ("soft", for example).

In this example, the "firmness" is changed. As illustrated in FIG. 6C to 6F, the display 28 may display the "firmness" that is currently set, or the "firmness" to be changed to by the receiving unit. In this example, the display 28 displays the number 4 or 5 as the display of the "firmness." For example, the number (degree of "firmness") of the display 28 is changed by an operation of the third receiving unit 53 or the fourth receiving unit 54.

The first to ninth brightnesses described above change, for example, in accordance with the amount of light emitted from the light emitting element 33 (see FIG. 3B). The first to ninth brightnesses described above are changed, for example, by the color (wavelength characteristics) of the light emitted from the light emitting element 33 (see FIG. 3B).

As described above, after step S150 (and step S160), step S104 (separate first action state R1) is executed (see FIG. 4). At this time, the second receiving unit 52 may be in the ON state (selected state). For example, in the example illustrated in FIG. 6F, in step S104 (separate first action state R1) that is after step S150 (and step S160), the second receiving unit 52 ("manual firmness operation") is in the third optical state T3. Meanwhile, the third user interface display unit 21c is in the OFF state and substantially is invisible.

Thus, in the present embodiment, the controller 110 transitions (returns) to the first mode M1 when, in the second mode M2, the first receiving unit 51 (for example, the back side button 50B) receives a separate first operation. At this time, the settings of the action conditions are applied to the actions of the device to be controlled 76o. Meanwhile, when, in the second mode M2, there are no operations of the user interface display units and the first receiving unit 51 has not received an operation for an extended period of time, operations in the second mode M2 are disabled. Thus, the action conditions can be set in a safer manner.

FIG. 7 is a schematic drawing illustrating the actions of the controller 110 according to Embodiment 1.

FIG. 7 illustrates the action states and the optical states of the example described above.

As illustrated in FIG. 7, it is possible to switch between the first mode M1 and the second mode M2 using the first receiving unit 51. It is possible to switch between the first to third action states R1 to R3 using the second receiving unit 52. It is possible to switch between the fourth action state R4 and the fifth action state R5 using the third receiving unit 53. It is possible to switch between the sixth action state R6 and the seventh action state R7 using the fourth receiving unit 54. In the present embodiment, various modifications can be made.

The third user interface display unit 21c is defined as a fifth receiving unit 55. As illustrated in FIG. 7, in the first mode M1 (the first action state R1), the fifth receiving unit 55 is in a tenth optical state T10. In the second action state R2 and the third action state R3, the fifth receiving unit 55 is in an eleventh optical state T11. The tenth optical state T10 includes at least one of a tenth brightness that is brighter than an eleventh brightness of the eleventh optical state, and a tenth color that differs from an eleventh color of the eleventh optical state. The tenth optical state T10 is the ON state, for example. The eleventh optical state T11 is the OFF state.

The second receiving unit 52 and the fifth receiving unit 55 have a complementary relationship. For example, when one of the second receiving unit 52 and the fifth receiving unit 55 is bright, the other is dark. Operations are easier to understand and can be guided due to the necessary user interface display unit being selectively brightened (or changed to a conspicuous color).

Next, another example of actions according to the present embodiment will be described. In the following, an example of actions is described for a case in which the current action mode is set to "manual firmness operation", and the action mode is switched to "automatic firmness operation." In the following example, the third user interface display unit 21c ("automatic firmness operation") corresponds to the second receiving unit 52. Moreover, the first user interface display unit 21a ("83 W") corresponds to the third receiving unit 53. The second user interface display unit 21b ("91 W") corresponds to the fourth receiving unit 54. In this example, the current setting is "83 W."

FIG. 8A to 8D are schematic drawings illustrating actions of the controller 110 according to Embodiment 1.

Figure 8A:
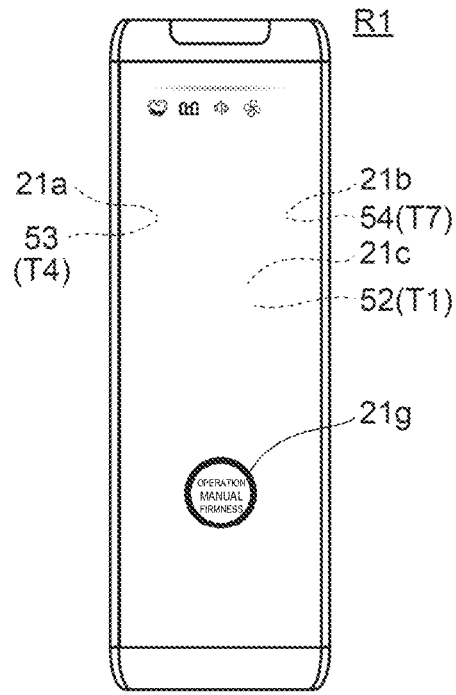
FIG. 8A to 8D are schematic drawings illustrating actions of the controller according to Embodiment 1.

As illustrated in FIG. 8A, in the first action state R1, the seventh user interface display unit 21g ("manual firmness operation") is in the third optical state T3 (the ON state). Meanwhile, the second receiving unit 52 is in the first optical state T1 (the OFF state, for example). The third receiving unit 53 is in the fourth optical state T4 (the OFF state, for example). The fourth receiving unit 54 is in the seventh optical state T7 (the OFF state, for example).

Figure 8B:
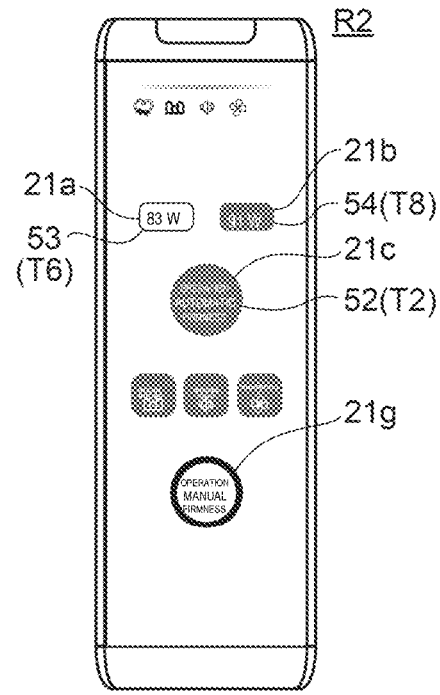

As illustrated in FIG. 8B, when the first receiving unit 51 (the back side button 50B, for example) has received the first operation, the controller 110 transitions to the second action state R2. In the second action state R2, the second receiving unit 52 is in the second optical state T2 (the half-ON state HON, for example). The third receiving unit 53 is in the sixth optical state T6 (the ON state, for example). The fourth receiving unit 54 is in the eighth optical state T8 (the half-ON state, for example).

Figure 8C:
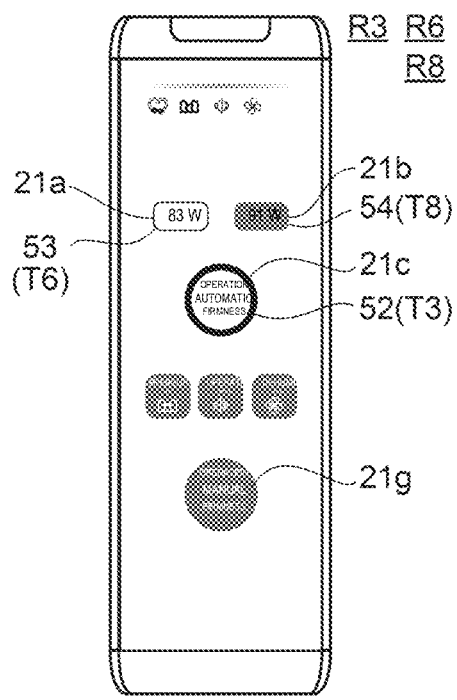
Figure 8D:
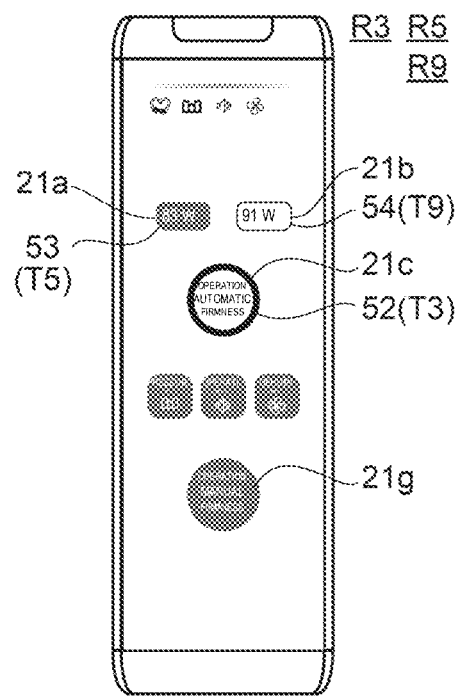

In this example, when the second receiving unit 52 has received the second operation, the controller 110 transitions to the third action state R3. As illustrated in FIGS. 8C and 8D, in the third action state R3, the second receiving unit 52 is in the third optical state T3 (the ON state, for example).

The optical states of the third receiving unit 53 and the fourth receiving unit 54 change depending on whether the receiving units received an operation. For example, when the third receiving unit 53 has received the third operation, as illustrated in FIG. 8C, the third receiving unit 53 assumes the sixth optical state T6 (the ON state, for example). At this time, the fourth receiving unit 54 is in the eighth optical state T8 (the half-ON state HON, for example).

Meanwhile, when the fourth receiving unit 54 has received the fourth operation, as illustrated in FIG. 8D, the fourth receiving unit 54 assumes the ninth optical state T9 (the ON state, for example). At this time, the third receiving unit 53 is in the fifth optical state T5 (the half-ON state HON, for example).

In this example, in the fifth action state R5 (at this time, the sixth action state R6), the action condition is set to the first condition ("83 W"). In the fourth action state R4 (at this time, the seventh action state R7), the action condition is set to the second condition ("91 W").

Next, another example of actions according to the present embodiment will be described. In the following, an example is described of actions of the fourth user interface display unit 21d ("pressure switching"), the fifth user interface display unit 21e ("operation sounds"), and the sixth user interface display unit 21f ("dehumidification"). In this example as well, the first receiving unit 51 is implemented as the back side button 50B.

FIG. 9 is a flowchart illustrating actions of the controller 110 according to Embodiment 1.

Figure 10A:
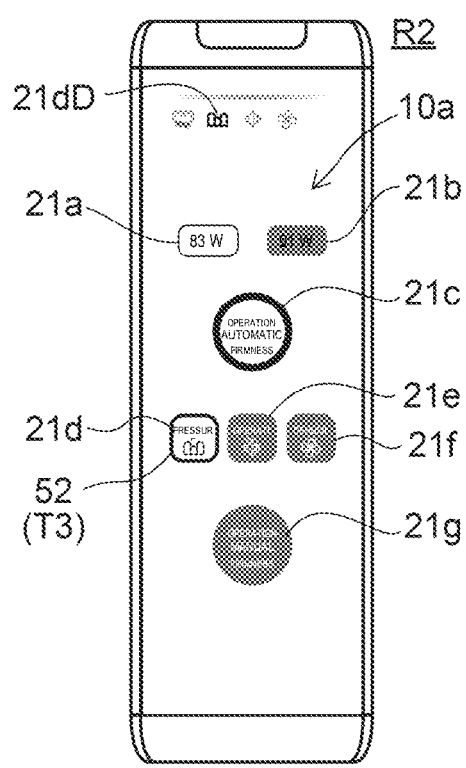
FIGS. 10A and 10B are schematic drawings illustrating actions of the controller according to Embodiment 1.
Figure 10B:
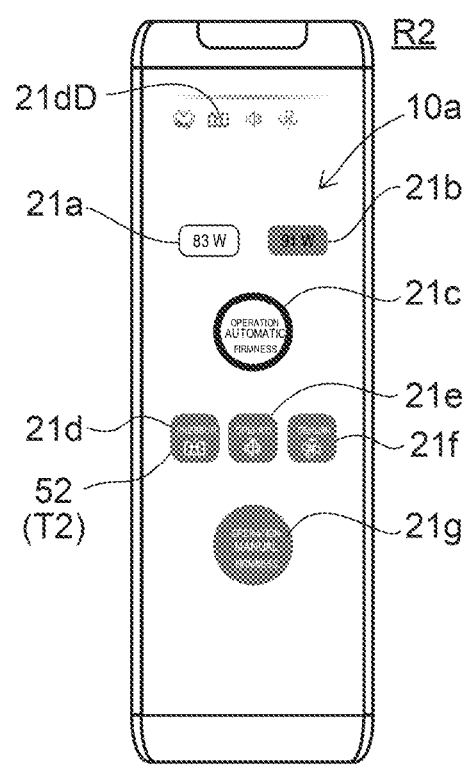

FIGS. 10A and 10B are schematic drawings illustrating actions of the controller 110 according to Embodiment 1.

In FIG. 9, the portions that are the same as in FIG. 4 are omitted. In this example, the fourth user interface display unit 21d corresponds to the second receiving unit 52. As illustrated in FIG. 9, when the power is turned to the ON state, the controller 110 assumes the first mode M1 (action mode) (step S104). In this state, the second receiving unit 52 (the third user interface display unit 21c) is in the first optical state T1 (the OFF state, for example). The first surface 10a is in the state illustrated in FIG. 5B or 5C, for example.

It is determined whether the first receiving unit 51 has received the first operation (step S106). When the first receiving unit 51 has received the first operation, the controller 110 transitions to the second mode M2 (the condition setting mode) (step S110). In this case as well, as necessary, the calibration (step S111) may be carried out.

It is determined whether the second receiving unit 52 is in a selected state (step S220). In this example, it is determined if "pressure switching" is set or if "pressure switching" is not set. When the second receiving unit 52 is selected, the second receiving unit 52 assumes the third optical state T3 (the ON state, for example) (step S221). When the second receiving unit 52 is not selected, the second receiving unit 52 assumes the second optical state T2 (the half-ON state HON, for example) (step S222).

Thus, in this example, the optical state of the second receiving unit 52 changes depending on whether the function corresponding to the second receiving unit 52 is selected.

For example, as illustrated in FIG. 10A, when the second receiving unit 52 is selected, the second receiving unit 52 assumes the third optical state T3 (the ON state, for example). As illustrated in FIG. 10B, when the second receiving unit 52 is not selected, the second receiving unit 52 assumes the second optical state T2 (the half-ON state HON, for example). Thus, the current setting state is displayed in an easy-to-understand manner.

After the displaying of the current selection state (step S221 or step S222), it is determined whether the second receiving unit 52 has received the second operation (step S223). When the second receiving unit 52 has received the second operation, the second receiving unit 52 assumes the third optical state T3 (step S224).

For example, the second operation receiving/non-receiving state may be switched each time the second receiving unit 52 receives the second operation. For example, the receiving state is assumed when the second receiving unit 52 is operated one time. Then, if the second receiving unit 52 is operated one more time, the non-receiving state is assumed. When in the receiving state, the second receiving unit 52 assumes the third optical state T3 (the ON state, for example). When in the non-receiving state, the second receiving unit 52 assumes the second optical state T2 (the half-ON state HON, for example) (step S226).

When in the receiving state, the function (in this example, "pressure switching") that corresponds to the second receiving unit 52 assumes the set state (step S225). When in the non-receiving state, the function (in this example, "pressure switching") that corresponds to the second receiving unit 52 assumes the non-set state (step S227).

Thereafter, the processing of step S220 to step S227 is repeated until the first receiving unit 51 receives the first operation (step S150).

Thus, configurations are possible in which a single user interface display unit is provided with three optical states.

Moreover, the three optical states are linked to the operable state of that user interface display unit.

In this example, the controller 110 is in the first mode M1 when in the first action state R1, which is prior to the first receiving unit 51 receiving the first operation (see FIG. 9). The controller 110 transitions to the second mode M2 when the first receiving unit 51 receives the first operation (see FIG. 9). The second receiving unit 52 is in the first optical state T1 in the first action state R1. When the second receiving unit 52 receives the second operation in the second mode M2, the second receiving unit 52 switches to the second optical state T2 or the third optical state T3.

For example, when the second receiving unit 52 receives the second operation, the ON state/OFF state of the first action ("pressure switching", for example) of the device to be controlled 76o is switched. In another example, the second receiving unit 52 is in the second optical state T2 when the first action is the OFF state in the first action state R1 and it is prior to the second receiving unit 52 receiving the second operation in the second mode M2. The second receiving unit 52 is in the third optical state T3 when the first action is the ON state in the first action state R1 and it is prior to the second receiving unit 52 receiving the second operation in the second mode M2. Thus, the current state is displayed in an easy-to-understand manner by the second optical state T2 and the third optical state T3.

In this case as well, the second optical state T2 includes at least one of the second brightness that is brighter than the first brightness of the first optical state T1, and the second color that differs from the first color of the first optical state T1. The third optical state T3 includes at least one of the third brightness that differs from the second brightness, and the third color that differs from the first color and the second color. For example, when the second receiving unit 52 is selected, the third brightness of the third optical state T3 is brighter than the second brightness. In another example, when the second receiving unit 52 is not selected, the third brightness of the third optical state T3 is darker than the second brightness.

The actions described with reference to FIG. 9 can also be executed when the second receiving unit 52 is implemented as the fifth user interface display unit 21e or the second receiving unit 52 is implemented as the sixth user interface display unit 21f.

Figure 11A:
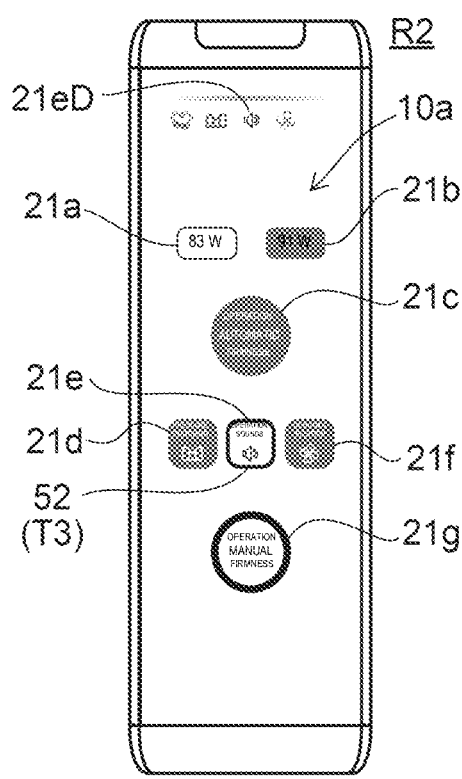
FIGS. 11A and 11B are schematic drawings illustrating actions of the controller according to Embodiment 1.
Figure 11B:
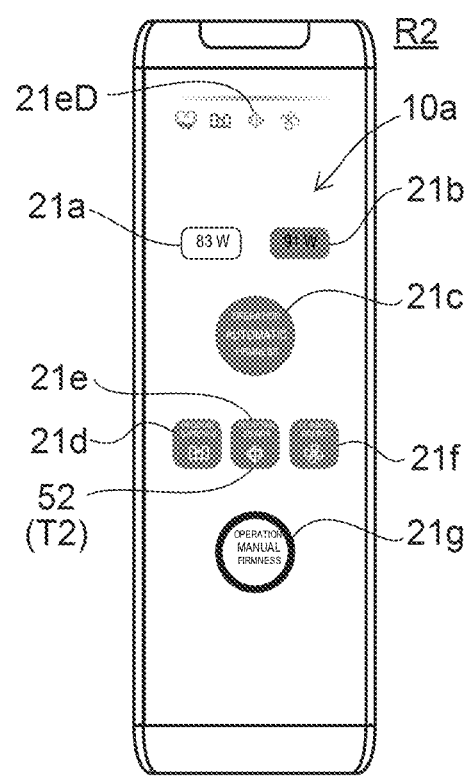

FIGS. 11A and 11B are schematic drawings illustrating actions of the controller 110 according to Embodiment 1.

These drawings correspond to a case in which the second receiving unit 52 is implemented as the fifth user interface display unit 21e. As illustrated in FIG. 11A, when the second receiving unit 52 ("operation sounds") is in the selected state, the second receiving unit 52 is in the third optical state T3. As illustrated in FIG. 11B, when the second receiving unit 52 ("operation sounds") is in the un-selected state, the second receiving unit 52 is in the second optical state T2.

Figure 12A:
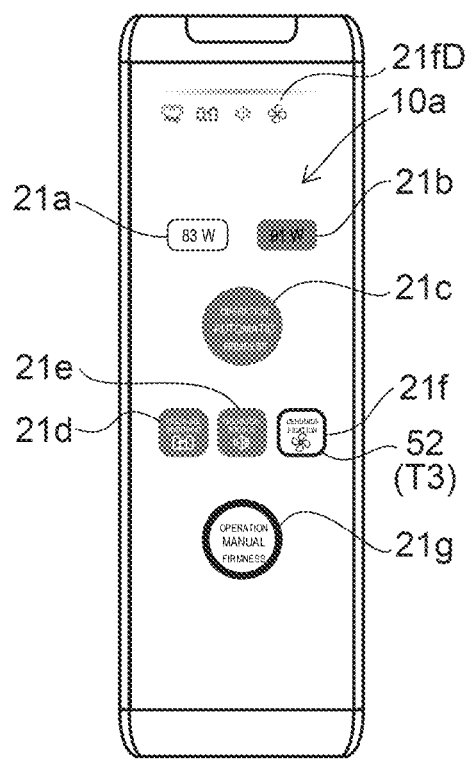
FIGS. 12A and 12B are schematic drawings illustrating actions of the controller according to Embodiment 1.
Figure 12B:
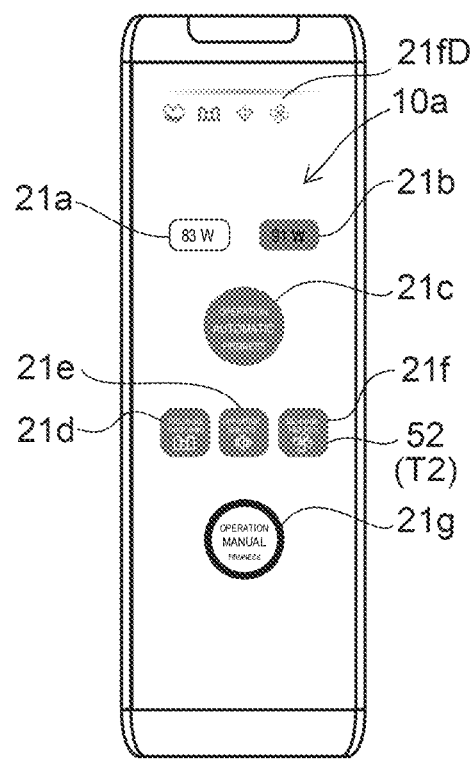

FIGS. 12A and 12B are schematic drawings illustrating actions of the controller 110 according to Embodiment 1.

These drawings correspond to a case in which the second receiving unit 52 is implemented as the sixth user interface display unit 21f. As illustrated in FIG. 12A, when the second receiving unit 52 ("dehumidification") is in the selected state, the second receiving unit 52 is in the third optical state T3. As illustrated in FIG. 12B, when the second receiving unit 52 ("dehumidification") is in the un-selected state, the second receiving unit 52 is in the second optical state T2.

Next, another example of actions according to the present embodiment will be described. In the following, the second receiving unit 52 is implemented as the first user interface display unit 12a, and the third receiving unit 53 is implemented as the second user interface display unit 21b. In this case as well, the first receiving unit 51 is implemented as the back side button 50B.

In this case as well, the controller 110 is in the first mode M1 when in the first action state R1 prior to the first receiving unit 51 receiving the first operation, and the controller 110 transitions to the second mode M2 when the first receiving unit 51 receives the first operation. The second receiving unit 52 has the first to third optical states T1 to T3. The third receiving unit 53 has the fourth to sixth optical states T4 to T6. In the first action state R1, the second receiving unit 52 is in the first optical state T4 (the OFF state, for example), and the third receiving unit 53 is in the fourth optical state T4 (the OFF state, for example). Next, examples of the optical states of the second receiving unit 52 and the third receiving unit 53 are described.

Figure 13A:
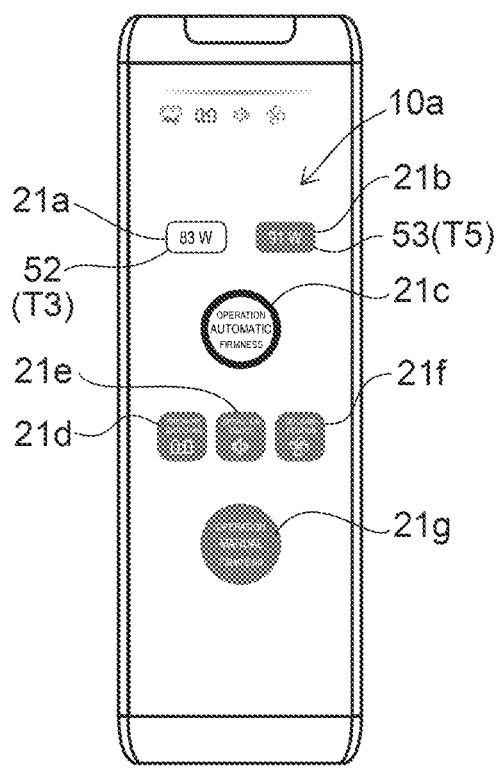
FIGS. 13A and 13B are schematic drawings illustrating actions of the controller according to Embodiment 1.
Figure 13B:
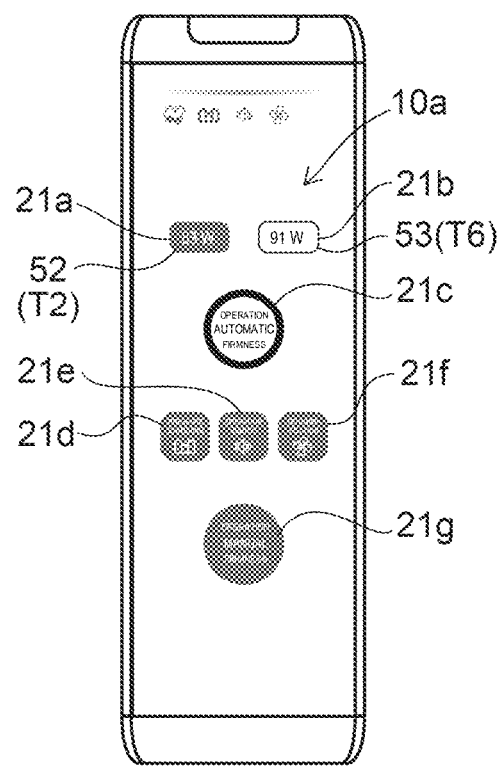

FIGS. 13A and 13B are schematic drawings illustrating actions of the controller 110 according to Embodiment 1.

As illustrated in FIG. 13A, when the second receiving unit 52 has received the second operation in the second mode M2, the second receiving unit 52 assumes the third optical state T3 (the ON state, for example). At this time, the third receiving unit 53 is in the fifth optical state T5 (the half-ON state HON, for example).

When the third receiving unit 53 has received the third operation in the second mode M2, the third receiving unit 53 assumes the sixth optical state T6 (the ON state, for example), as illustrated in FIG. 13B. At this time, the second receiving unit 52 is in the third optical state T3 (the half-ON state HON, for example).

Thus, when the second receiving unit 52 receives the second operation in the second mode M2, or the third receiving unit 53 receives the third operation in the second mode M2, the second receiving unit 52 switches to the second optical state T2 and then to third optical state T3, and the third receiving unit 53 switches to the fifth optical state T5 and then to the sixth optical state T6. When the second receiving unit 52 is in the second optical state T2, the third receiving unit 53 is in the sixth optical state T6. When the second receiving unit 52 is in the third optical state T3, the third receiving unit 53 is in the fifth optical state T5. These optical states are, for example, the same as those described above.

In one example, when, in the first action state R1, the device to be controlled 76o (in this example, the mattress 76) is in a state corresponding to the second receiving unit 52, the second receiving unit 52 is in the third optical state T3 prior to the third receiving unit 53 receiving the third operation in the second mode M2. For example, when the current setting is "83 W", the second receiving unit 53 is in the third optical state T3 (the ON state, for example) prior to the third receiving unit 53 that corresponds to "91 W" being operated.

In another example, the third receiving unit 53 is in the sixth optical state T6 (the ON state, for example) when, in the first action state R1, the device to be controlled 76o is in a state corresponding to the third receiving unit 53 and it is prior to the second receiving unit 52 receiving the second operation in the second mode M2.

Thus, the current state is displayed in an easy-to-understand manner. When an action condition is settable, the corresponding user interface device is displayed.

Next, another example of actions according to the present embodiment will be described. In the following, an example is described of the actions performed when the specific action button 68 is operated. In one example, the specific action is an action of making the mattress 76 firm. Making the mattress 76 firm facilitates changing the posture of the user of the bed, changing diapers, getting into a wheelchair, and the like. Bedsores and the like are more likely to occur when the mattress 76 is made firm for an extended period of time. As such, the specific action turns OFF (auto-OFF function) when the performance of the specific action exceeds a certain time (for example, one hour).

In the following example, the second receiving unit 52 is implemented as the seventh user interface display unit 21g, and the fifth receiving unit 55 is implemented as the third user interface display unit 21c.

Figure 14A:
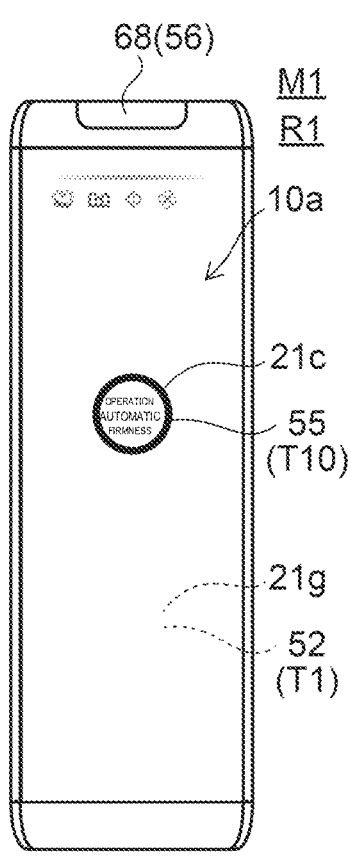
FIG. 14A to 14C are schematic drawings illustrating actions of the controller according to Embodiment 1.
Figure 14B:
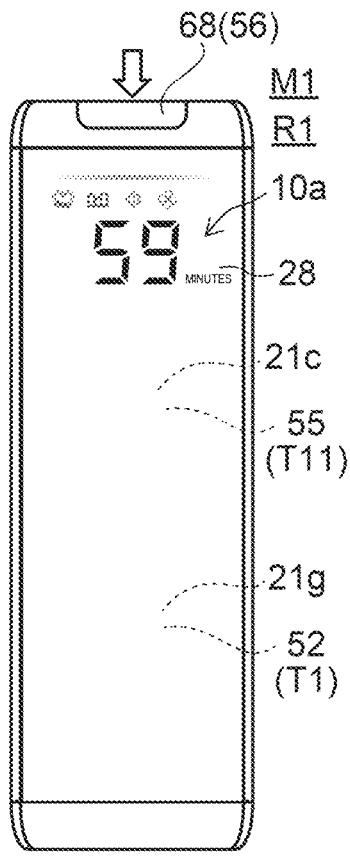
Figure 14C:
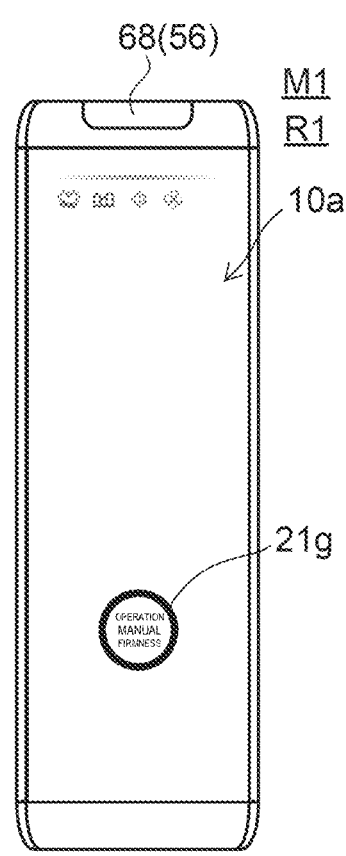

FIG. 14A to 14C are schematic drawings illustrating actions of the controller 110 according to Embodiment 1.

As illustrated in these drawings, in one example, the specific action button 68 corresponds to a sixth receiving unit 56. As illustrated in FIG. 14A, prior to receiving an operation, the sixth receiving unit 56 (the specific action button 68) is in the first mode M1 (the second receiving unit 52 is in the first action state R1). The second receiving unit 52 is in the first optical state T1 and substantially is invisible. At this time, the fifth receiving unit 55 is in the tenth optical state T10 (the ON state, for example).

In this state, when the sixth receiving unit 56 (the specific action button 68) receives an operation, the second receiving unit 52 is in the first optical state T1, and the fifth receiving unit 55 is in the eleventh optical state T11 (the OFF state, for example). In one example, performance time (or remaining time) of the action by the specific action button 68 is displayed on the display 28.

As illustrated in FIG. 14C, when the action mode is "manual firmness operation", the seventh user interface display unit 21g may be in the ON state.

Figure 15:
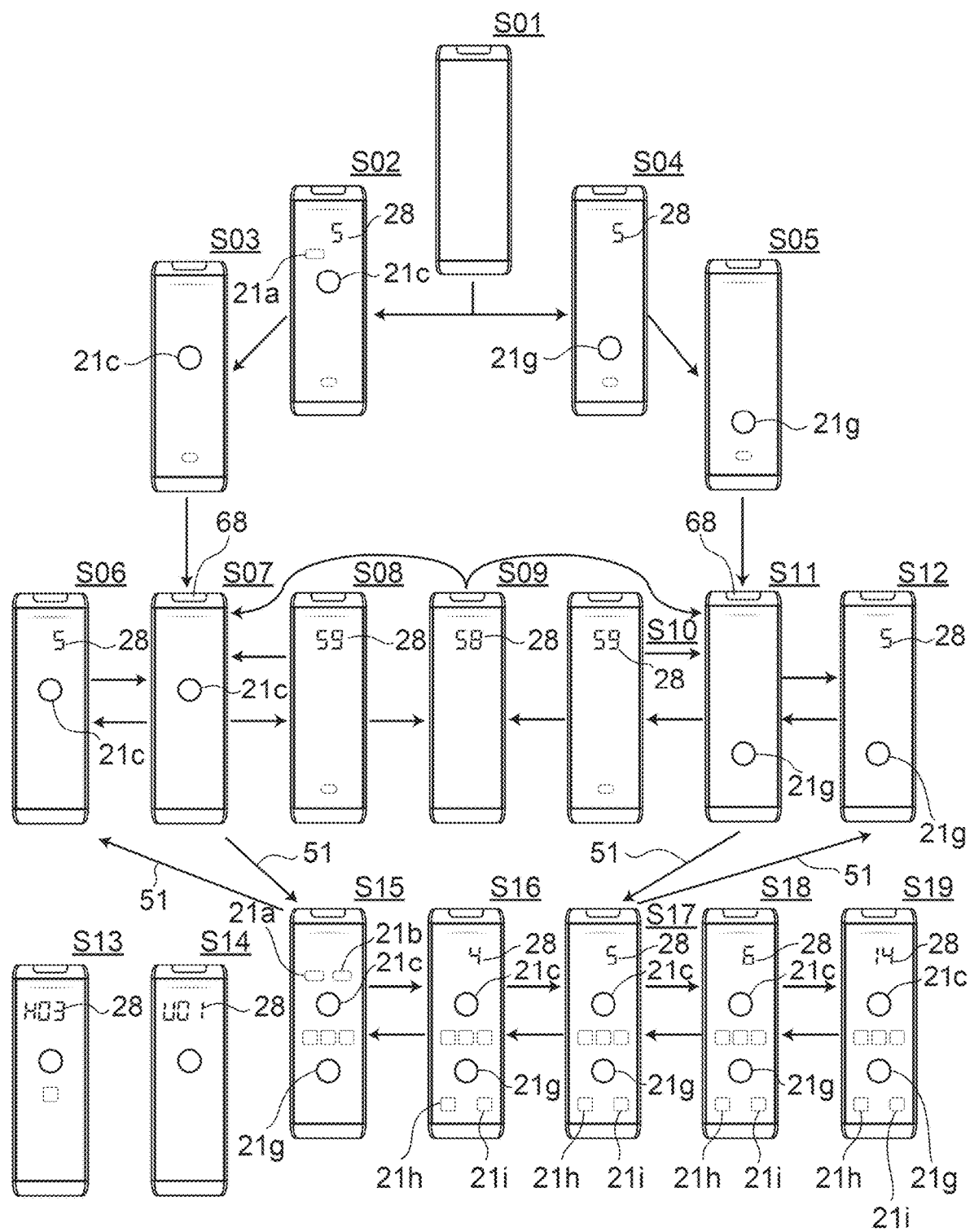
FIG. 15 is a schematic drawing illustrating actions of the controller according to Embodiment 1.

FIG. 15 is a schematic drawing illustrating the actions of the controller 110 according to Embodiment 1.

As illustrated in FIG. 15, in state S01, the power is in the OFF state. When the power is set to the ON state, the controller 110 transitions to state S02 or state S04. State S02 is "automatic firmness operation." State S04 is "manual firmness operation."

In state S02, the third user interface display unit 21c assumes the ON state. At this time, the current setting state (for example, "bed link", "pressure switching", "operation sounds", "dehumidification", "firmness", "width setting", "not ready", or the like) is displayed.

In one example, when a predetermined amount of time (for example, 20 seconds) in state S02 elapses, the controller 110 transitions to state S03. In state S03, a portion of the plurality of current setting states is displayed. The air pump 76c supplies air. In one example, the "not ready" display turns OFF and the controller 110 transitions to state S07 when the air supplying is complete. State S07 is one state of the action mode.

When the specific action button 68 is operated (the button is pressed) in state S07, the controller 110 transitions to state S08 (air supply) and then to state S09 (air supply completed). During these operations, the specific action button 68 may be turned ON.

The controller 110 may transition to state S06 when the third user interface display unit 21c is operated in state S07. In state S06, the "current firmness", for example, is displayed on the display 28. In one example, when a predetermined amount of time (for example, 20 seconds) in state S06 elapses, the controller 110 returns to state S07.

In cases in which the controller 110 has transitioned to state S04 after the power has been turned ON, the seventh user interface display unit 21g assumes the ON state. At this time, the current setting state (for example, "bed link", "pressure switching", "operation sounds", "dehumidification", "firmness", "width setting", "not ready", or the like) is displayed.

In one example, when a predetermined amount of time (for example, 20 seconds) in state S04 elapses, the controller 110 transitions to state S05. In state S05, a portion of the plurality of current setting states is displayed. The air pump 76c supplies air. In one example, the "not ready" display turns OFF and the controller 110 transitions to stage S11 when the air supplying is complete. State S11 is one state of the action mode.

When the specific action button 68 is operated (the button is pressed) in state S11, the controller 110 transitions to state S10 (air supply) and then to stage S09 (air supply completed). During these actions, the specific action button 68 may be turned ON.

The controller 110 may transition to state S12 when the seventh user interface display unit 21g is operated in state S11. The "current firmness", for example, is displayed on the display 28 in state S12. In one example, when a predetermined amount of time (for example, 20 seconds) of state S12 elapses, the controller 110 returns to state S11.

When the back side button 50B (see FIG. 1C), for example, is operated in state S06 or state S07, the controller 110 transitions to state S15. The second mode M2 described above is performed in state S15. When the back side button 50B, for example, is operated in state S11 and state S12, the controller 110 transitions to state S17. The second mode M2 described above is performed in state S17.

The controller 110 transitions between states S15 to S19 due to operations of the various user interface display units in the second mode M2. In one example, a number related to the "firmness" to be set is displayed on the display 28. When the back side button 50B is operated in states S15 to S19, the controller 110 returns to state S06 or state S12.

In one example, errors may occur. In such a case, the error is displayed by state S13 or state S14, depending on the nature of the error.

In the present embodiment, the necessary "buttons" are displayed (for example, turned ON) at the necessary times. When unnecessary, the displaying of the "buttons" is turned OFF. In one example, the displaying is carried out using a plurality of states (for example, the ON state and the half-ON state HON). Thus, a controller and an electric furniture that are easier to use can be provided.

In the present embodiment, touch-type "buttons" are implemented. Accordingly, the first surface 10a is flat and, as such, is easy to clean and is sanitary.

The surface of the first surface 10a may deform due to being touched. In such a case, operation detection may become unstable. The detection can be stabilized, for example, by carrying out the calibration described above. For example, the second receiving unit 52 may be calibrated at one or more of the time of transition from the first mode M1 to the second mode M2, the time of transition from the second action state R2 to the third action state R3, and the time of turning the power ON.

Embodiment 2

Figure 16A:
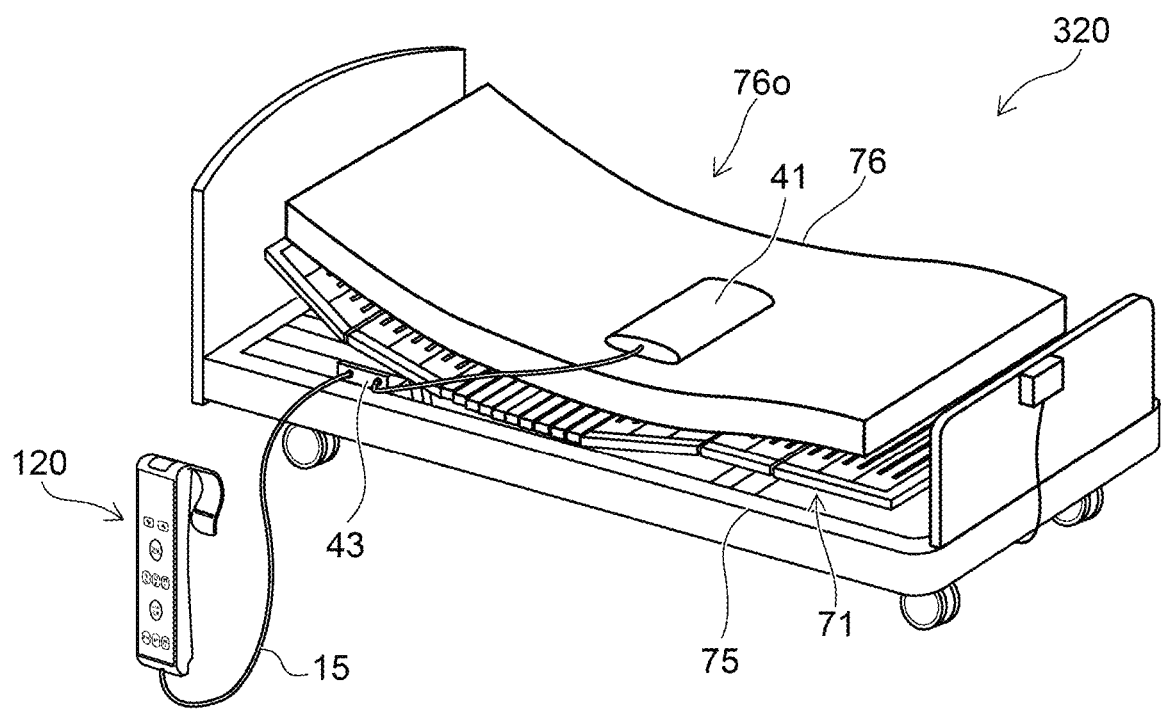
FIGS. 16A and 16B are schematic perspective views illustrating a controller and an electric furniture according to Embodiment 2.
Figure 16B:
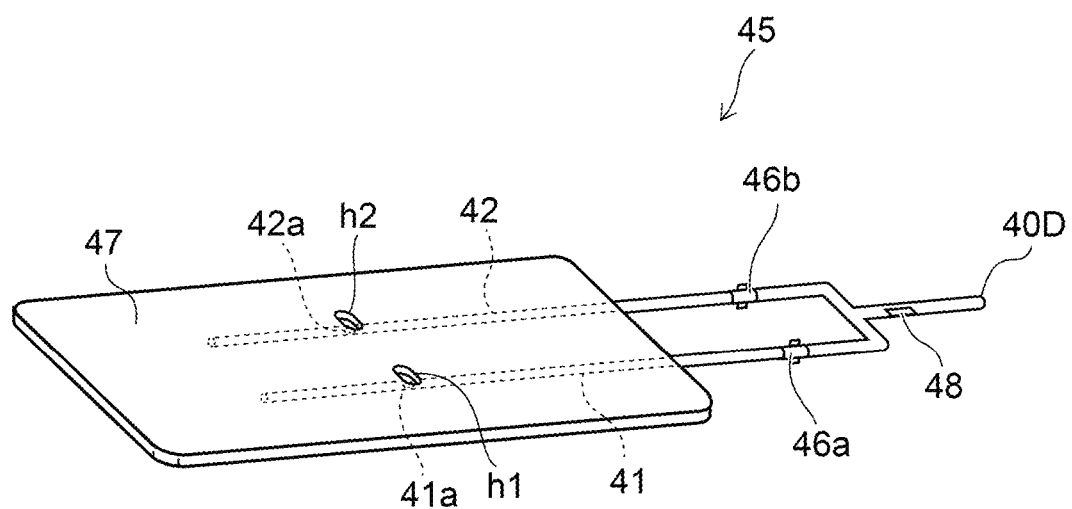

FIGS. 16A and 16B are schematic perspective views illustrating a controller and an electric furniture according to Embodiment 2.

FIG. 16B illustrates a portion of the elements of the electric furniture. As illustrated in FIG. 16B, a controller 120 according to Embodiment 2 is used together with a sensor 45. In one example, an electric furniture 320 according to the present embodiment includes the controller 120 and the sensor 45.

In one example, the sensor 45 is an excrement sensor. A section 71, for example, is provided on a frame 75 of a bed. A mattress 76 is provided on the section 71. The sensor 45 is provided on the mattress 76. The sensor 45 is connected to a control unit 43.

In one example, the control unit 43 and the controller 120 are connected to each other. The connection between the control unit 43 and the controller 120 may be wired or wireless. In this example, the controller 120 is connected to the control unit 43 via a cable 15. The control unit 43 may be considered to be a part of the sensor 45.

The actions of the sensor 45 are controlled by the operations of the controller 120. In one example, the controller 120 is implemented as a remote controller of the electric furniture 320. The sensor 45 is an example of a device to be controlled 76o by the controller 120.

FIG. 16B illustrates the sensor 45 (in this example, an excrement sensor). The sensor 45 includes, for example, a sheet portion 47 and tubes (in this example, a first tube 41 and a second tube 42). Holes (for example, a first hole h1 and a second hole h2) are provided in the sheet portion 47. The first tube 41 includes a first opening 41a, for example. The second tube 42 includes a second opening 42a. In one example, the first hole h1 overlaps with the first opening 41a. In one example, the second hole h2 overlaps with the second opening 42a.

A first pump 46a is provided at an end portion of the first tube 41. A second pump 46b is provided at an end portion of the second tube 42. An odor sensor 48 is provided on the drain side of the pumps. The pumps suction the gases near the first hole h1 and the second hole h2 through the tubes. The buttocks (diaper or the like, for example) of the user are positioned near the holes. When the user excretes, gas containing the odor caused by the excrement is sent through the tubes to the odor sensor 48. The odor sensor 48 detects the odor, thereby detecting the excrement. The suctioned gas is discharged through a discharge port 40D. In the present embodiment, various modifications can be made to the sensor 45.

For example, a notification signal may be sent to a caregiver or the like when the sensor 45 detects excrement. In such a case, the caregiver or the like goes to where the user of the bed (subject) is located, and changes the diaper. At this time, it is preferable that the actual type of excrement (urine or feces) is recorded. Furthermore, there may actually be no excrement, despite a notification signal having been sent. By recording the types of excrement and whether or not there was excrement, the subject can be provided with better service. The recording of the types of excrement and whether or not there was excrement can be carried out using the controller 120.

Moreover, with such a sensor 45, there are various settings such as notification signal transmission channel settings, operation sounds enabling/disabling settings, sensitivity settings, and the like. Such settings can be performed using the controller 120.

Hereinafter, an example of the controller 120 is described. In the following, the device to be controlled 76o is an excrement sensor.

FIG. 17A to 17C are schematic drawings illustrating the controller 120 and the electric furniture 320 according to Embodiment 2.

As illustrated in FIG. 17A, first to tenth user interface display units 31a to 31j are provided on a first surface 10a.

At least one of the user interface display units is capable of receiving an operation (for example, an operation by a user or the like), and can be displayed. In this case, the displaying of the user interface display units includes an ON state, an OFF state, and a half-ON state. In FIG. 17A, the plurality of states of the displaying are indicated by the states of the images.

FIG. 17B illustrates a plate member 38 that serves as the first surface 10a. In this example, a first layer 38L is provided on the plate member 38. The first layer 38L is formed by printing or the like, for example. Even when the user interface display units are in the OFF state, the first layer 38L reflects ambient light and, thus, can be recognized. FIG. 17B corresponds to a situation in which all of the user interface display units are in the OFF state. In FIG. 17A, the user interface display units are in the ON state. As illustrated in FIG. 17A, in, for example, the fourth user interface display unit 31d, it is possible to recognize the display pattern by the first layer 38L and also a display (border) indicating that the fourth user interface display unit 31d is in the ON state.

The first user interface display unit 31a is, for example, capable of receiving an operation for raising the transmission channel. The second user interface display unit 31b is, for example, capable of lowering the transmission channel. The third user interface display unit 31c is, for example, capable of receiving an input (operation) of "send."

The fourth user interface display unit 31d is, for example, capable of receiving an input (operation) of "urine excrement." The fifth user interface display unit 31e is, for example, capable of receiving an input (operation) of "feces excrement." The sixth user interface display unit 31f is, for example, capable of receiving an input (operation) of "no excrement."

The seventh user interface display unit 31g is, for example, capable of receiving an operation related to "replace filter." For example, when a filter is provided in the sensor portion of the sensor 45, the sensor portion sends a notification of a request for "replace filter." The seventh user interface display unit 31g performs actions related to "replace filter."

The eighth user interface display unit 31h is, for example, capable of displaying that "operation sounds" (one of the action conditions) is set to the ON state or to the OFF state. The eighth user interface display unit 31h is, for example, capable of receiving an operation for setting "operations sounds" to the ON state or the OFF state. The setting of "operation sounds" is switched from the ON state to the OFF state or from the OFF state to the ON state as a result of the eighth user interface display unit 31h receiving an operation.

The ninth user interface display unit 31i is, for example, capable of displaying that "record/test" (one of the action conditions) is set to the ON state or to the OFF state. The ninth user interface display unit 31i is, for example, capable of receiving an operation for setting "record/test" to the ON state or the OFF state. The setting of "record/test" is switched from the ON state to the OFF state or from the OFF state to the ON state as a result of the ninth user interface display unit 31i receiving an operation.

The tenth user interface display unit 31j is, for example, capable of displaying that the "sensitivity" setting (one of the action conditions) is set to the ON state or to the OFF state. The tenth user interface display unit 31j is, for example, capable of receiving an operation for setting the "sensitivity" setting to the ON state or the OFF state. The "sensitivity" setting is switched from the ON state to the OFF state or from the OFF state to the ON state as a result of the tenth user interface display unit 31j receiving an operation.

FIG. 17C illustrates the display 28. The display 28 is capable of displaying the transmission channel, time, or the like. In this example, the display 28 includes a display section 30iD. The display section 31iD displays the action state (in this example, "record/test") of the ninth user interface display unit 31i. For example, when "record/test" is in the ON state, the display section 31iD assumes the ON state.

As illustrated in FIG. 17A, a pause button 65 is provided on a side portion (top portion) of the controller 120. As described above, a notification signal is sent to a caregiver or the like when the sensor 45 detects excrement. The caregiver or the like operates the pause button 65 (presses the button, for example). The pressing of the pause button stops the notification signal. Then, the caregiver changes the diaper. At this time, the caregiver or the like uses the controller 120 to record the type of excrement and whether or not there was excrement. In the following, the first receiving unit 51 corresponds to the pause button 65. The second receiving unit 52 corresponds to the fourth user interface display unit 31d, for example.

Figure 18A:
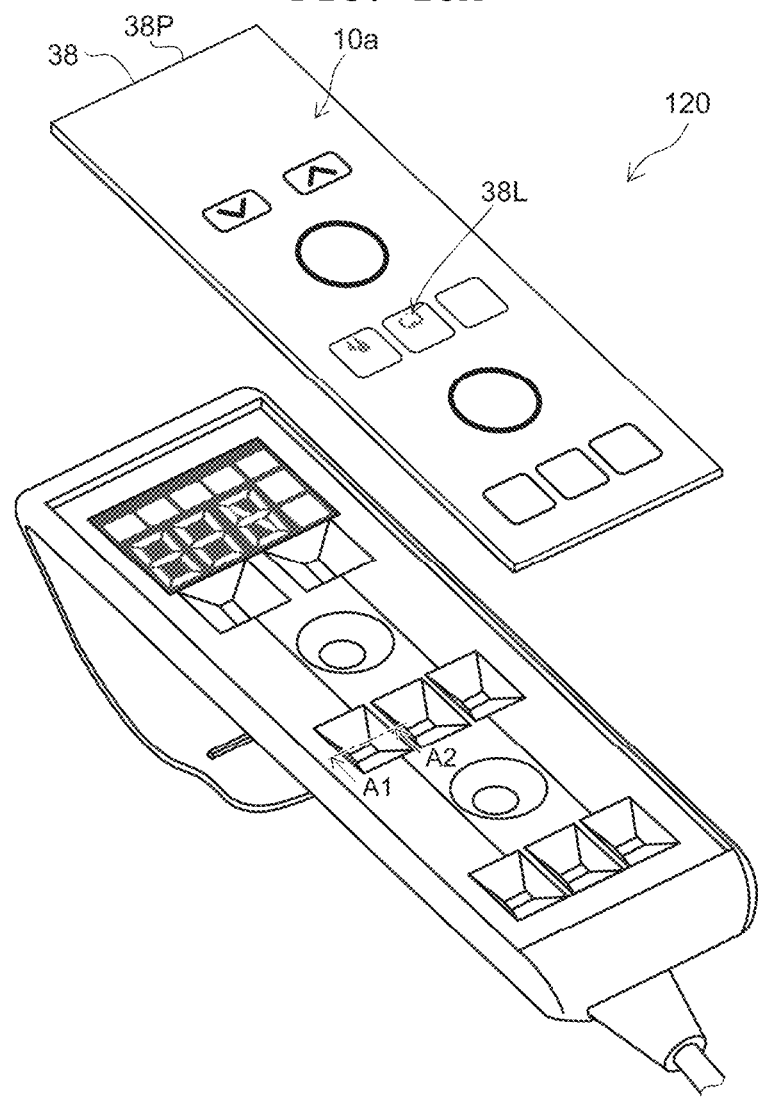
FIGS. 18A and 18B are schematic drawings illustrating the controller according to Embodiment 2.
Figure 18B:
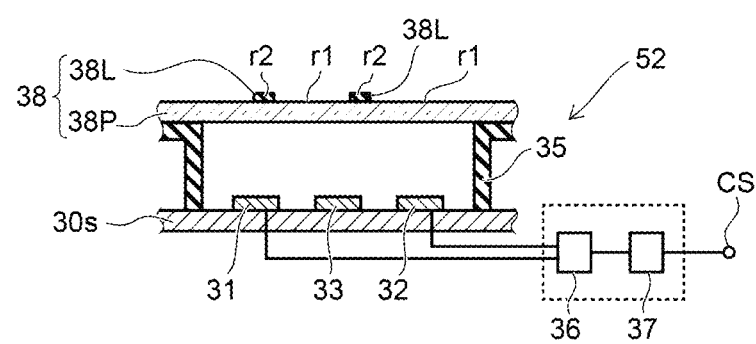

FIGS. 18A and 18B are schematic drawings illustrating the controller 120 according to Embodiment 2.

In order to make FIG. 18A easier to view, the plate member 38 is drawn separated from the controller 120. FIG. 18B is a cross-sectional view taken along line A1-A2 of FIG. 18A. In this example, a cross-section of the fourth user interface display unit 31d (the second receiving unit 52, for example) is illustrated. The other user interface display units may be provided with a structure similar to that of the fourth user interface display unit 31d.

As illustrated in FIGS. 18A and 18B, the plate member 38 includes a plate 38P and a first layer 38L. The first layer 38L is provided on the plate 38P. In one example, at least a portion of the plate 38P is provided between at least a portion of a first electrode 31 and at least a portion of the first layer 38L. In one example, at least a portion of the plate 38P is provided between at least a portion of a second electrode 32 and at least a portion of the first layer 38L. In one example, at least a portion of the plate 38P is provided between at least a portion of a light emitting element 33 and at least a portion of the first layer 38L.

In this example as well, the brightness (for example, ON state, OFF state, and half-ON state) of the second receiving unit 52 can change in accordance with the amount of light (for example, the brightness) emitted from the light emitting element 33.

Next, an example of actions of the first receiving unit 51 (the pause button 65) and the second receiving unit 52 (the fourth user interface display unit 31d) is described.

FIG. 19A to 19E are schematic drawings illustrating actions of the controller 120 according to Embodiment 2.

FIG. 19A illustrates a power OFF state. In this state, the display pattern of the first layer 38L can be recognized at a position that corresponds to the fourth to sixth user interface display units 31d to 31f.

FIG. 19A illustrates a power ON state. In this state, the sensor 45 is performing detection. In one example, excrement is detected.

As illustrated in FIG. 19C, the notification signal is sent when excrement is detected. "Call", for example, is displayed on the display 28. The states illustrated in FIGS. 19B and 19C correspond to the first mode M1. The sensor 45 is active in the first mode M1. At this time, the second receiving unit 52 (in this example, the fourth user interface display unit 31*d*) is in the first action state R1 and the first optical state T1 (the OFF state, for example).

The caregiver, for example, operates the pause button 65 (the first receiving unit 51). For example, the caregiver presses the pause button 65. As a result, the controller 120 transitions to the second mode M2 illustrated in FIG. 19D. At this time, the second receiving unit 52 (in this example, the fourth user interface display unit 31*d*) is in the second action state R2 and the second optical state T2 (the half-ON state, for example).

The caregiver inspects the state of the excrement, for example. Then, depending on the state of the excrement, the caregiver operates the fourth to sixth user interface display units 31*d* to 31*f*. When, for example, there is urine excrement, the caregiver operates (touch inputs, for example) the fourth user interface display unit 31*d*. As a result of this operation, the second receiving unit 52 (in this example, the fourth user interface display unit 31*d*) assumes the third action state R3 and the third optical state T3 (the ON state, for example).

The fifth user interface display unit 31*e* and the sixth user interface display unit 31*f* may perform actions similar to those of the fourth user interface display unit 31*d*.

As illustrated in FIG. 19E, when, for example, the third user interface display unit 31*c* ("send") is operated, the content (information) input using the fourth to sixth user interface display units 31*d* to 31*f* is sent.

Then (after changing the diaper, for example), the caregiver presses the pause button 65 (the first receiving unit 51) to return the controller 120 to the first mode M1 (the state of FIG. 19B, for example).

Thus, the controller 120 also includes the first receiving unit 51 (the pause button 65) and the second receiving unit 52 (the fourth user interface display unit 31*d*). The controller 120 is capable of controlling the device to be controlled 76*o* (in this example, the sensor 45).

The controller 120 is in the first mode M1 when in the first action state R1, which is prior to the first receiving unit 51 receiving the first operation (see FIGS. 19B and 19C). The controller 120 transitions to the second mode M2 when the first receiving unit 51 receives the first operation (see FIGS. 19B and 19C).

The second receiving unit 52 is in the first optical state T1 in the first action state R1 (see FIGS. 19B and 19C). The second receiving unit 52 is in the second optical state T2 (see FIG. 19D) in the second action state R2, which is prior to the second receiving unit 52 receiving the second operation in the second mode M2. The second receiving unit 52 is in the third optical state T3 (see FIG. 19E) in the third action state R3 in which the second receiving unit 52 has received the second operation in the second mode M2.

The second optical state T2 includes at least one of a second brightness that is brighter than a first brightness of the first optical state T1, and a second color that differs from a first color of the first optical state T1. The third optical state T3 includes at least one of a third brightness that is brighter than the second brightness, and a third color that differs from the first color and the second color.

These actions can also be executed when the second receiving unit 52 is implemented as the fifth user interface display unit 31*e* or the sixth user interface display unit 31*f*.

For example, as illustrated in FIGS. 19B and 19C, when unnecessary, the fourth to sixth user interface display units 31*d* to 31*f* are not displayed (are in the OFF state, for example). As illustrated in FIG. 19D, the fourth to sixth user interface display units 31*d* to 31*f* assume the half-ON state HON when in a state in which operations can be received. The fourth to sixth user interface display units 31*d* to 31*f* assume the ON state when the fourth to sixth user interface display units 31*d* to 31*f* receive an operation. Operations can be guided as a result of these actions. Thus, the operations are facilitated and, for example, a controller and an electric furniture that are easier to use can be provided.

Next, another example of actions of the controller 120 will be described.

Figure 20A:
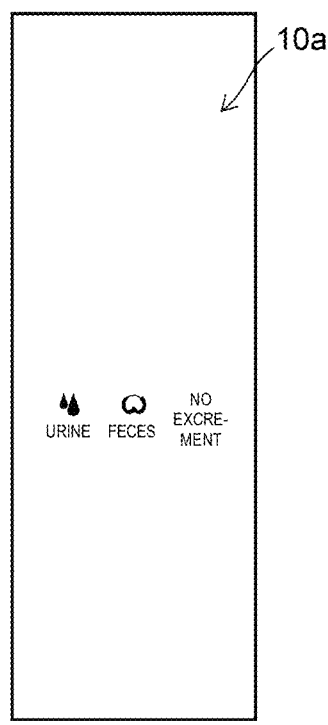
FIG. 20A to 20C are schematic drawings illustrating actions of the controller according to Embodiment 2.
Figure 20B:
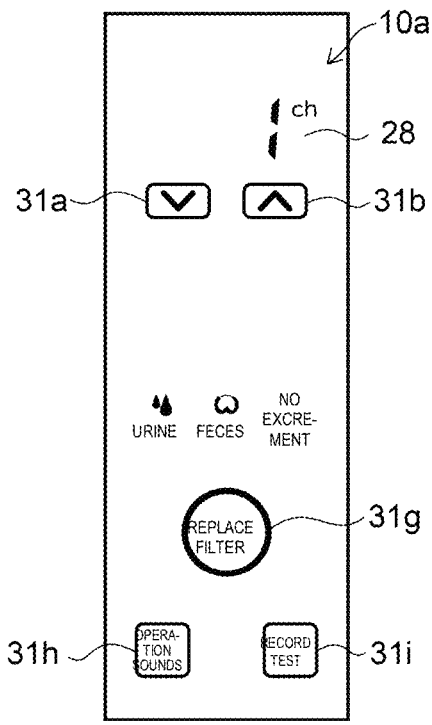
Figure 20C:
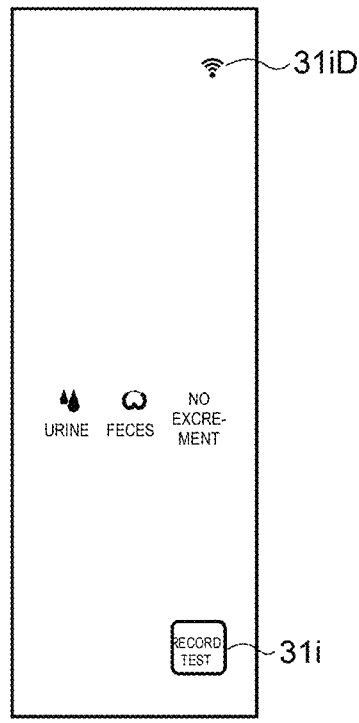

FIG. 20A to 20C are schematic drawings illustrating actions of the controller 110 according to Embodiment 2.

FIG. 20A illustrates a power ON state (state in which detection is being performed by the sensor 45). When the back side button 50B (see FIG. 1C) is operated in this state, the controller 120 transitions to a condition setting mode.

As illustrated in FIG. 20B, for example, in the condition setting mode, the first user interface display unit 31*a*, the second user interface display unit 31*b*, the seventh user interface display unit 31*g*, the eighth user interface display unit 31*h*, and the ninth user interface display unit 31*i* are in the ON state.

When, for example, the first user interface display unit 31*a* or the second user interface display unit 31*b* is operated, the channel number changes according to that operation. The channel number is displayed on the display 28. In one example, actions corresponding to the seventh user interface display unit 31*g*, the eighth user interface display unit 31*h*, and the ninth user interface display unit 31*i* are carried out.

As illustrated in FIG. 20C, the display section 31*i*D may flash when the ninth user interface display unit 31*i* ("record/test") is operated.

FIG. 21 is a schematic drawing illustrating the actions of the controller 120 according to Embodiment 2.

As illustrated in FIG. 21, in state S31 (the power ON state), detection is being performed by the sensor 45. When, in state S31, an excrement notification signal SigN is sent from the sensor 45, the controller 120 transitions to state S32.

In state S32, "call" is displayed on the display 28. When the pause button 65 (the first receiving unit 51) is operated (operation 65A or operation 51A) in state S32, the controller transitions to state S33. In state S33, the actions described while referencing FIGS. 19D and 19E are performed.

When, in state S33, the third user interface display unit 31*c* ("send") is operated (operation 31*c*A), the controller 120 returns to state S31. In this case, the information input by the fourth to sixth user interface display units 31*d* to 31*f* is sent. Additionally, when the pause button 65 (the first receiving unit 51) is operated (operation 65A or operation 51A), the controller returns to state S31. Additionally, when a certain amount of time (Timer1) elapses, the controller 120 returns to state S31. The amount of time (Timer1) is, for example, 20 minutes.

When the pause button 65 (the first receiving unit 51) is operated (operation 65A or operation 51A) in state S31, the controller may transition to state S33.

When the back side button 50B is operated (operation 50BA) in state S31, the controller 120 transitions to state S34. State S34 is a condition setting mode. In state S34, the first user interface display unit 31*a*, the second user interface display unit 31*b*, the seventh user interface display unit 31*g*, the eighth user interface display unit 31*h*, the ninth user interface display unit 31*i*, and the like are operated and the desired condition settings are performed.

When, for example, the ninth user interface display unit 31*i* ("record/test") is operated (operation 31*i*A) in state S34, the controller 120 transitions to state S35. When, in state S35, the ninth user interface display unit 31i is operated, the display section 31iD flashes. When, in state S35, the ninth user interface display unit 31i ("record/test") is operated (operation 31iA), the controller 120 returns to state S34. When the back side button 50B is operated (operation 50BA) in state S35, the controller 120 transitions to state S31. Additionally, when a certain amount of time (Timer3) elapses, the controller 120 returns to state S31. The amount of time (Timer3) is, for example, 30 minutes.

When the back side button 50B is operated (operation 50BA) in state S34, the controller 120 returns to state S31. Additionally, when a certain amount of time (Timer2) elapses in state S34, the controller 120 transitions to state S31. The amount of time (Timer2) is, for example, 30 seconds.

When, in the states S31 to S35 described above, an error signal SigE is received, the controller 120 transitions to state S36. In state S36, an error display (in this example, "U01") is displayed on the display 28.

In the states S31 to S36, it is possible to receive a filter replacement signal SigF that notifies of filter replacement.

The excrement notification signal SigN can be received in state S34 and state S35 as well. The controller transitions to state S32 when the notification signal SigN is received.

In state S34, the operation 31aA of the first user interface display unit 31a, the operation 31bA of the second user interface display unit 31b, the operation 31gA of the seventh user interface display unit 31g, and the operating 31hA of the eighth user interface display unit 31h, can be received.

In state S33, the operation 31dA of the fourth user interface display unit 31d, the operation 31eA of the fifth user interface display unit 31e, and the operation 31fA of the sixth user interface display unit 31f can be received.

In the present embodiment, the controller 110 and the controller 120 can easily be interchanged by replacing the plate member 38 and changing the program of the control circuit 37, for example.

The embodiments may include the following configurations (technical proposals):

Configuration 1

A controller capable of controlling a device to be controlled, the controller including a first receiving unit and a second receiving unit; wherein the controller is in a first mode when in a first action state prior to the first receiving unit receiving a first operation, and the controller transitions to a second mode when the first receiving unit receives the first operation;

the second receiving unit is in a first optical state in the first action state;

the second receiving unit is in a second optical state in a second action state prior to the second receiving unit receiving a second operation in the second mode;

the second receiving unit is in a third optical state in a third action state in which the second receiving unit has received the second operation in the second mode;

the second optical state includes at least one of a second brightness that is brighter than a first brightness of the first optical state, and a second color that differs from a first color of the first optical state; and the third optical state includes at least one of a third brightness that is brighter than the second brightness, and a third color that differs from the first color and the second color.

Configuration 2

The controller according to Configuration 1, wherein:

in the first mode, the controller is in an action mode, in the second mode, the controller is in a condition setting mode related to an action of the device to be controlled, and in the third action state, the controller is capable of receiving an action condition.

Configuration 3

The controller according to Configuration 1 or 2, further including:

a third receiving unit; wherein the third receiving unit is in a fourth optical state in the first action state and the second action state, the third receiving unit is in a fifth optical state in a fourth action state prior to the third receiving unit receiving a third operation in the third action state, the third receiving unit is in a sixth optical state in a fifth action state in which the third receiving unit has received the third operation in the third action state, the fifth optical state includes at least one of a fifth brightness that is brighter than a fourth brightness of the fourth optical state, and a fifth color that differs from a fourth color of the fourth optical state, and the sixth optical state includes at least one of a sixth brightness that is brighter than the fifth brightness, and a sixth color that differs from the fourth color and the fifth color.

Configuration 4

The controller according to Configuration 3, further including:

a fourth receiving unit; wherein the fourth receiving unit is in a seventh optical state in the first action state and the second action state, the fourth receiving unit is in an eighth optical state in a sixth action state prior to the fourth receiving unit receiving a fourth operation in the third action state, the fourth receiving unit is in a ninth optical state in a seventh action state in which the fourth receiving unit has received the fourth operation in the third action state, the eighth optical state includes at least one of an eighth brightness that is brighter than a seventh brightness of the seventh optical state, and an eighth color that differs from a seventh color of the seventh optical state, and the ninth optical state includes at least one of a ninth brightness that is brighter than the eighth brightness, and a ninth color that differs from the seventh color and the eighth color.

Configuration 5

The controller according to Configuration 4, wherein:

the fourth receiving unit is in the ninth optical state when the third receiving unit is in the fifth optical state, and the fourth receiving unit is in the eighth optical state when the third receiving unit is in the sixth optical state.

Configuration 6

The controller according to any one of Configurations 1 to 5, wherein the second receiving unit is in a third optical state in the separate first action state.

Configuration 7

The controller according to any one of Configurations 3 to 6, wherein:

in the fifth action state, the action condition is set to a first condition, and in the seventh action state, the action condition is set to a second condition.

Configuration 8

The controller according to Configuration 7, wherein the second condition is the opposite of the first condition.

Configuration 9

The controller according to Configuration 1 or 2, further including:

a third receiving unit and a fourth receiving unit; wherein the third receiving unit is in a fourth optical state in the first action state and the second action state, the third receiving unit is in the fifth optical state in a the fourth action state in the third action state, the third receiving unit is in the sixth optical state in a fifth action state in the third action state, the fifth optical state includes at least one of a fifth brightness that is brighter than a fourth brightness of the fourth optical state, and a fifth color that differs from a fourth color of the fourth optical state, the sixth optical state includes at least one of a sixth brightness that is brighter than the fifth brightness, and a sixth color that differs from the fourth color and the fifth color, the fourth receiving unit is in a seventh optical state in the first action state and the second action state, the fourth receiving unit is in an eighth optical state in the fifth action state, the fourth receiving unit is in a ninth optical state in the fourth action state, the eighth optical state includes at least one of an eighth brightness that is brighter than a seventh brightness of the seventh optical state, and an eighth color that differs from a seventh color of the seventh optical state, and the ninth optical state includes at least one of a ninth brightness that is brighter than the eighth brightness, and a ninth color that differs from the seventh color and the eighth color.

Configuration 10

The controller according to Configuration 9, wherein:

in the fifth action state, the action condition is set to a first condition, and in the fourth action state, the action condition is set to a second condition.

Configuration 11

The controller according to any one of Configurations 1 to 10, further including:

a fifth receiving unit; wherein the fifth receiving unit is in a tenth optical state in the first action state, the fifth receiving unit is in the eleventh optical state in the second action state and the third action state, and the tenth optical state includes at least one of a tenth brightness that is brighter than an eleventh brightness of the eleventh optical state, and a tenth color that differs from an eleventh color of the eleventh optical state.

Configuration 12

The controller according to Configuration 11, further including:

a sixth receiving unit; wherein when the sixth receiving unit has received an operation, the second receiving unit is in the first optical state and the fifth receiving unit is in the eleventh optical state.

Configuration 13

A controller capable of controlling a device to be controlled, the controller including a first receiving unit and a second receiving unit; wherein the controller is in a first mode when in a first action state prior to the first receiving unit receiving a first operation, and the controller transitions to a second mode when the first receiving unit receives the first operation;

the second receiving unit is in a first optical state in the first action state;

when the second receiving unit receives a second operation in the second mode, the second receiving unit switches to a second optical state or a third optical state;

the second optical state includes at least one of a second brightness that is brighter than a first brightness of the first optical state, and a second color that differs from a first color of the first optical state; and the third optical state includes at least one of a third brightness that differs from the second brightness, and a third color that differs from the first color and the second color.

Configuration 14

The controller according to Configuration 13, wherein:

when the second receiving unit receives the second operation, an ON state/OFF state of the first operation of the device to be controlled is switched, the second receiving unit is in the second optical state when the first action is an OFF state in the first action state and it is prior to the second receiving unit receiving the second operation in the second mode, and the second receiving unit is in the third optical state when the first action is the ON state in the first action state and it is prior to the second receiving unit receiving the second operation in the second mode.

Configuration 15

A controller capable of controlling a device to be controlled, the controller including first to third receiving units; wherein the controller is in a first mode when in a first action state prior to the first receiving unit receiving a first operation, and the controller transitions to a second mode when the first receiving unit receives the first operation;

the second receiving unit has first to third optical states;

the third receiving unit has fourth to sixth optical states;

in the first action state, the second receiving unit is in the first optical state, and the third receiving unit is in the fourth optical state;

when the second receiving unit receives a second operation in the second mode, or the third receiving unit receives a third operation in the second mode, the second receiving unit switches to the second optical state and then to third optical state, the third receiving unit switches to the fifth optical state and then to the sixth optical state;

when the second receiving unit is in the second optical state, the third receiving unit is in the sixth optical state;

when the second receiving unit is in the third optical state, the third receiving unit is in the fifth optical state;

the second optical state includes at least one of a second brightness that is brighter than a first brightness of the first optical state, and a second color that differs from a first color of the first optical state;

the third optical state includes at least one of a third brightness that is brighter than the second brightness, and a third color that differs from the first color and the second color;

the fifth optical state includes at least one of a fifth brightness that is brighter than a fourth brightness of the fourth optical state, and a fifth color that differs from a fourth color of the fourth optical state; and the sixth optical state includes at least one of a sixth brightness that is brighter than the fifth brightness, and a sixth color that differs from the fourth color and the fifth color.

Configuration 16

The controller according to Configuration 15, wherein:

the second receiving unit is in the third optical state when the device to be controlled is in a state corresponding to the second receiving unit in the first action state, and it is prior to the third receiving unit receiving the third operation in the second mode, and the third receiving unit is in the sixth optical state when the device to be controlled is in a state corresponding to the third receiving unit in the first action state, and it is prior to the second receiving unit receiving the second operation in the second mode.

Configuration 17

The controller according to any one of Configurations 1 to 16, wherein, when the first receiving unit receives a separate first operation in the second mode, the controller transitions to the first mode, and the settings of the action conditions are applied to the actions of the device to be controlled.

Configuration 18

The controller according to any one of Configurations 1 to 17, wherein the second receiving unit is calibrated at least one of a time of transition from the first mode to the second mode, a time of transition from the second action state to the third action state, and a time of turning power ON.

Configuration 19

A controller capable of controlling a device to be controlled, the controller including a first receiving unit and a second receiving unit; wherein the controller is in a first mode when in a first action state prior to the first receiving unit receiving a first operation, and the controller transitions to a second mode when the first receiving unit receives the first operation;

the second receiving unit is in a first optical state in the first action state;

the second receiving unit is in a second optical state in a second action state prior to the second receiving unit receiving a second operation in the second mode;

the second receiving unit is in a third optical state in a third action state in which the second receiving unit has received the second operation in the second mode;

the second optical state differs from the first optical state; and the third optical state differs from the first optical state and differs from the second optical state.

Configuration 20

The controller according to Configuration 19, wherein: one of the second optical state and the third optical state is flashing, and another of the second optical state and the third optical state includes at least one of a second brightness that is brighter than a first brightness of the first optical state, and a second color that differs from a first color of the first optical state.

Configuration 21

The controller according to any one of Configurations 1 to 20, wherein:

the second receiving unit includes a first electrode, a second electrode, and a light emitting element, the second operation is received by the first electrode and the second electrode, and the first to third brightnesses change in accordance with an amount of light emitted from the light emitting element.

Configuration 22

The controller according to Configuration 21, wherein at least a portion of the light emitting element is provided between the first electrode and the second electrode.

Configuration 23

The controller according to Configuration 21 or 22, wherein the second operation is based on a change in capacitances of the first electrode and the second electrode.

Configuration 24

The controller according to any one of Configurations 21 to 23, further including:

a plate member; wherein the plate member includes a portion that overlaps with the second receiving unit, and a light transmittance of a first region of the portion is different than a light transmittance of a second region of the portion.

Configuration 25

The controller according to Configuration 24, wherein at least one of the first region and the second region includes information about the action conditions.

Configuration 26

The controller according to any one of Configurations 1 to 25, wherein:

the first receiving unit deforms when the first operation is received, and the second receiving unit does not deform when the second operation is received, or, deformation of the second receiving unit from when the second operation is received is smaller than deformation of the first receiving unit from when the first operation is received.

Configuration 27

An electric furniture including:

the controller according to any one of Configurations 1 to 26; and the device to be controlled.

Configuration 28

The electric furniture according to Configuration 27, wherein the device to be controlled includes an air mattress or an excretion sensor.

According to the embodiments, a controller and an electric furniture that are easier to use can be provided.

In the preceding, embodiments of the present invention have been described while referencing specific examples. However, the present disclosure is not limited to these specific examples. For example, one skilled in the art may similarly practice the invention by appropriately selecting specific configurations of the components included in the controller such as the sensor, the processing unit, the processing circuit, the movable section, the section, the mattress, and the like included in the electric furniture; and such practice is included in the scope of the invention to the extent that similar effects are obtained.

Furthermore, any two or more components of the specific examples may be combined within the extent of technical feasibility and are included in the scope of the invention to the extent that the spirit of the invention is included.

Moreover, all controllers and electric furniture capable of being implemented by an appropriate design modification by one skilled in the art based on the controller and the electric furniture described above as embodiments of the invention also are within the scope of the invention to the extent that the spirit of the invention is included.

Various modifications and alterations can be conceived by those skilled in the art within the spirit of the present invention, and it is understood that such modifications and alterations are also encompassed within the scope of the invention.

DESCRIPTION OF REFERENCE NUMERALS AND SIGNS

10*a*, 10*b*: First and second surfaces; 15: Cable; 21*a* to 21*j*: First to tenth user interface display units; 21*d*D to 21*f*D: Display sections; 28: Display; 30*s*: Substrate; 31: First electrode; 31a to 31j: First to tenth user interface display units; 31aA, 31bA, 31cA, 31dA, 31eA, 31fA, 31gA, 31hA, 31iA: Operations; 31iD: Display section; 32: Second electrode; 33: Light emitting element; 35: Spacer; 36: Detection circuit; 37: Control circuit; 38: Plate member; 38L: First layer; 38P: Plate; 40D: Discharge port; 41, 42: First and second tubes; 41a, 42a: First and second openings; 43: Control unit; 45: Sensor; 46a, 46b: First and second pumps; 47: Sheet portion; 48: Odor sensor; 50B: Back side button; 50BA: Operation; 51 to 56: First to sixth receiving units; 51A: Operation; 65: Pause button; 65A: Operation; 68: Specific action button; 71: Section; 75: Frame; 76: Mattress; 76a: Air mattress portion; 76b: Air cell; 76c: Pump unit; 76o: Device to be controlled; 76s: Sheet; 110,120: Controller; 310, 320: Electric furniture; CS: Control signal; HON: Half-ON state; M1, M2: First and second modes; R1 to R7: First to seventh action states; S01 to S19 and S31 to S36: States; SigE: Error signal; SigF: Filter replacement signal; SigN: Notification signal; T1 to T10: First to tenth optical states; h1, h2: First and second holes; r1, r2: First and second regions; t1, tm: Amount of time

The invention claimed is:

1. A controller capable of controlling a device, the controller including a first receiving unit and a second receiving unit, the controller having a first mode and a second mode, wherein:
    the controller changes between the first mode and the second mode when the first receiving unit receives a first operation;
    the second receiving unit is in a first state when the controller is in the first mode;
    the second receiving unit is in a second state or a third state when the controller is in the second mode;
    the controller changes the second receiving unit between the second state and the third state when the second receiving unit receives a second operation when the controller is in the second mode;
    brightness or colors for the second receiving unit in the first state, the second state, and the third state are different from each other.

2. The controller according to claim 1, wherein:
    the first mode is an action mode, and
    the second mode is a condition setting mode related to an action of the device.

3. The controller according to claim 1, wherein:
    a brightness or a color in the second state is brighter than a brightness or a color in the first state, and
    a brightness or a color in the third state is brighter than a brightness or a color in the second state.

4. The controller according to claim 1, wherein:
    the controller includes a first surface and a second surface, the second surface is opposite to the first surface,
    the first receiving unit is on the first surface, and
    the second receiving unit is on the second surface.

5. The controller according to claim 1, further including:
    a third receiving unit; wherein:
    the third receiving unit is in a fourth state when the second receiving unit is in the first and second state;
    the third receiving unit is in a fifth state or a sixth state when the second receiving unit is in the third state;
    the controller changes the third receiving unit between the fifth state and the sixth state when the third receiving unit receives a third operation; and
    brightness or colors for the third receiving unit in the fourth state, the fifth state, and the sixth state are different from each other.

6. The controller according to claim 5, wherein:
    a brightness or a color in the fifth state is brighter than a brightness or a color in the fourth state, and
    a brightness or a color in the sixth state is brighter than a brightness or a color in the fifth state.

7. The controller according to claim 6, further including:
    a fourth receiving unit; wherein:
    the fourth receiving unit is in a seventh state when the second receiving unit is in the first and second state;
    the fourth receiving unit is in an eighth state or a ninth state when the second receiving unit is in the third state;
    the controller changes the fourth receiving unit between the eighth state and the ninth state when the fourth receiving unit receives a fourth operation; and
    brightness or colors for the fourth receiving unit in the seventh state, the eighth state, and the ninth state are different from each other.

8. The controller according to claim 7, wherein:
    a brightness or a color in the eighth state is brighter than a brightness or a color in the seventh state, and
    a brightness or a color in the ninth state is brighter than a brightness or a color in the eighth state.

9. The controller according to claim 8, wherein:
    the fourth receiving unit is in the ninth state when the third receiving unit is in the fifth state, and
    the fourth receiving unit is in the eighth state when the third receiving unit is in the sixth state.

10. The controller according to claim 9, wherein:
    when the third receiving unit is in the fifth state, the action condition is set to a first condition, and
    when the fourth receiving unit is in the eighth state, the action condition is set to a second condition, the second condition being different from the first condition.

11. The controller according to claim 10, wherein:
    the first condition is opposite of the second condition.

12. The controller according to claim 1, wherein:
    the second receiving unit includes a first electrode, a second electrode, and a light emitting element,
    the second operation is received by the first electrode and the second electrode, and
    the brightness in the first to third states changes in accordance with an amount of light emitted from the light emitting element.

13. The controller according to claim 12, wherein at least a portion of the light emitting element is between the first electrode and the second electrode.

14. The controller according to claim 13, wherein the second operation is based on a change in capacitances of the first electrode and the second electrode.

15. A controller capable of controlling a device, the controller including first to third receiving units, wherein:
    the controller changes between the first mode and the second mode when the first receiving unit receives a first operation;
    the second receiving unit has first to third states;
    the third receiving unit has fourth to sixth states;
    in the first mode, the second receiving unit is in the first state, and the third receiving unit is in the fourth state;
    when the second receiving unit receives a second operation in the second mode, or the third receiving unit receives a third operation in the second mode, if the second receiving unit is in the second state, the third receiving unit is in the sixth state, and if the second receiving unit is in the third state, the third receiving unit is in the fifth state.

16. The controller according to claim 15, wherein:
    brightness or colors in the first state, the second state, and the third state are different from each other, and brightness or colors in the fourth state, the fifth state, and the sixth state are different from each other.

17. The controller according to claim 16, wherein:
a brightness or a color in the second state is brighter than a brightness or a color in the first state, and
a brightness or a color in the third state is brighter than a brightness or a color in the second state.

18. The controller according to claim 16, wherein:
a brightness or a color in the fifth state is brighter than a brightness or a color in the fourth state, and
a brightness or a color in the sixth state is brighter than a brightness or a color in the fifth state.

19. The controller according to claim 15, wherein:
the second receiving unit includes a first electrode, a second electrode, and a light emitting element,
the second operation is received by the first electrode and the second electrode, and
the brightness in the first to third state change in accordance with an amount of light emitted from the light emitting element.

20. The controller according to claim 19, wherein at least a portion of the light emitting element is between the first electrode and the second electrode.

* * * * *